United States Patent [19]

Fabbio

[11] Patent Number: 5,335,346
[45] Date of Patent: Aug. 2, 1994

[54] ACCESS CONTROL POLICIES FOR AN OBJECT ORIENTED DATABASE, INCLUDING ACCESS CONTROL LISTS WHICH SPAN ACROSS OBJECT BOUNDARIES

[75] Inventor: Robert A. Fabbio, Austin, Tex.

[73] Assignee: International Business Machines Corporation, Armonk, N.Y.

[21] Appl. No.: 808,060

[22] Filed: Dec. 12, 1991

Related U.S. Application Data

[63] Continuation of Ser. No. 352,081, May 15, 1989, abandoned.

[51] Int. Cl.$^5$ .............................................. G06F 12/14
[52] U.S. Cl. ..................................... 395/600; 395/425; 364/DIG. 1; 364/246.6; 364/282.1; 364/283.2; 364/286; 364/286.4; 364/286.5
[58] Field of Search .................... 395/600, 62, 63, 65, 395/725, 700, 425; 380/3, 4

[56] References Cited

U.S. PATENT DOCUMENTS

| | | | |
|---|---|---|---|
| 4,455,602 | 6/1984 | Baxter, III et al. | 364/200 |
| 4,498,131 | 2/1985 | Bratt et al. | 364/200 |
| 4,498,132 | 2/1985 | Ahlstrom et al. | 364/200 |
| 4,545,012 | 10/1985 | Clancy et al. | 364/200 |
| 4,621,321 | 11/1986 | Boebert et al. | 364/200 |
| 4,675,810 | 6/1987 | Gruner et al. | 364/200 |
| 4,675,829 | 6/1987 | Clemenson | 364/513 |
| 4,731,734 | 3/1988 | Gruner et al. | 364/200 |
| 5,206,951 | 4/1993 | Khoyi et al. | 395/650 |

OTHER PUBLICATIONS

Rabotti, F., et al., "A Model of Authorization for Object-Oriented and Semantic Databases," *Proc. Intl. Conf. on Extending Database Technology*, Venice, Italy, Mar. 1988, pp. 231–250.

Kim, Won. *Introduction to Object-Oriented Databases*, Chpt. 8, The MIT Press, 1990, pp. 90–106.

Spooner, David L., "The Impact of Inheritance on Security in Object-Oriented Database Systems," Report, Computer Science Department, Rensselaer Polytechnic Institute, Nov. 1988, pp. 1–11.

Fernández, Eduardo B., et al., "Definition and Evaluation of Access Rules in Data Management Systems," *Proceedings 1st International Conference on Very Large Databases*, Boston, 1975, pp. 268–285.

Vinter, Stephen T., "Extended Discretionary Access Controls," *Proceedings of the 1988 Symposium on Security and Privacy*, IEEE Comput. Soc. Press, Apr. 1988, pp. 39–49.

Shimizu, Kentaro, et al., "Hierarchical Object Groups in Distributed Operating Systems," *8th International Conference on Distributed Computing Systems*, IEEE Comput. Soc. Press, Jun. 1988, pp. 18–24.

(List continued on next page.)

*Primary Examiner*—Paul V. Kulik
*Attorney, Agent, or Firm*—Wayne P. Bailey; Robert M. Carwell

[57] ABSTRACT

The system and method of this invention provides an access control list which spans across object boundaries in an object oriented database. In addition to providing read and write access permissions, the access control list provides execute semantics which apply to the execution of methods in an object oriented database. Within the entries of the access control lists, each of the permissions for read, write, and execute can be assigned separately to each of a number of ids representing user ids or group ids. Upon request for access to the data by the user, the user id of the user and the group ids for which the user is a member are searched for within the entries to determine whether the user has the privileges to perform the operation requested against the objects. In addition, the access control policies are inherited from an object's superobject; resulting in a least privilege for the object.

2 Claims, 24 Drawing Sheets

OTHER PUBLICATIONS

E. B. Fernandez et al, "A Security Model for Object Oriented Databases", 1989 IEEE Computer Society Symposium on Security and Privacy, May 3, 1989, pp. 110–115.

Object Oriented System Supporting Dynamic Configuration, H. J. M. Decuypere, 1986.

Domains: A New Approach to Distributed System Management, D. C. Robinson & M. S. Sloman, 1988.

Integrating an Object Server with Other Worlds, A. Purdy & B. Schuchardt, ACM Transactions, vol. 5, No. 1, Jan. 1987.

Data Model Issues for Object–Oriented Applications, J. Banerjee et al, ACM Transactions, vol. 5, No. 1, Jan. 1987.

Enhancing the Object–Oriented Concepts for Database Support, Won Kim et al, IEEE, 1987.

Access Control for a Shared Data Base, R. J. Bamford & D. M. Choy IBM TDB, vol. 23, No. 4, Sep. 1980.

1986 International Workshop on Object–Oriented Database Systems, Sep. 1986.

DEVICES OBJECT CLASS — 54

| ATTRIBUTES | | | METHODS | | TRIGGERS |
|---|---|---|---|---|---|
| TYPE 1 | TYPE 2 | LINK | | | |
| CUSTOMIZED | LOGICAL | | GET | SET | |
| PREDEFINED | LOGICAL | | GET | SET | |
| CUSTOMIZED | PHYSICAL | x | GET | SET | |
| PREDEFINED | PHYSICAL | | GET | SET | |

CUSTOMIZED DEVICES — 55

| ATTRIBUTES | | | | METHODS | | | | TRIGGERS |
|---|---|---|---|---|---|---|---|---|
| DEVICE NAME | ID | TYPE | LINK | | | | | |
| LP0 | 2 | PRINTER | | CONFIG | DEFINE | UNCONFIG | UNDEFINE | |
| DISK0 | 1 | HARD DISK | | CONFIG | DEFINE | UNCONFIG | UNDEFINE | |

CUSTOMIZED DEVICES ~ 601

| 612 DNAME | 613 DD INSTANCE | 614 DD TYPE | ... | 621 DEFINE METHOD | 622 CONFIG METHOD | 623 UNDEFINE | 624 UNCONFIG | 625 LINK | ... | 630 LINK | 640 LINK |
|---|---|---|---|---|---|---|---|---|---|---|---|
| HDISK0 602 | HD | HD | | /etc/sysmgt/ HDISK_dfmeth 627 | /etc/sysmgt/ HDISK_cfmeth | /etc/sysmgt/ HDISK_UDFMETH | /etc/sysmgt/ HDISK_UCFMETH 628 | | | | |
| LP0 603 | LP | LP | | /etc/sysgmt/ LP_dfmeth | /etc/sysgmt/ LP_cfmeth | ... | ... | | | | |
| TTY0 604 | TTY | TTY | | /etc/sysgmt/ TTY_dfmeth | /etc/sysgmt/ TTY_cfmeth | ... | ... | | | | |
| TTY1 605 | TTY | TTY | | ... | ... | ... | ... | | | | |
| SA0 606 | | | | | | | | | | | |
| VG1 607 | VG0 | LVG | | | | | | | | | |
| VG2 608 | VG1 | LVG | | | | | | | | | |

CUSTOMIZED ATTRIBUTE ~ 631

| KEY | ATTNAME | QUALIFIER | ATTTYPE | ATTVALUE |
|---|---|---|---|---|
| TTY | BAUD | DEFAULT | INT | 9600 |
| TTY | PARITY | DEFAULT | CHAR | EVEN |

```
struct method_description {                     ~1301
    char method_name [MAX_DESCRIP_NAME];         ~1302
    char optional_params [MAX_PARM_LIST];        ~1303
    char std_out [MAX_MOUTPUT_SIZE];             ~1304
    char std_err [MAX_MOUTPUT_SIZE];             ~1305
    int return_value;                            ~1306
};
```

FIG. 13

```
odmchange ()  ~1418 include <odm.h>   ~1432 int odmchange ( objecthandle, objcontent, ucrit, informat, user_flags, methods_to_do )
                    ~1443      ~1438   ~1435   ~1436      ~1437
long objecthandle;
struct descrip_content * objcontent;
struct objsrch *ucrit;
int informat;
int user_flags;
struct method_descriptor * methods_to_do;
```

FIG. 14I odmopen () —— 1402 include <odm.h>   1431        1432 int odmopen ( objectdescp, objecthandle )
struct class_info * objectdescp;
long * objecthandle;

FIG. 14A odmclose () —— 1404 include <odm.h>   1432    1433 int odmclose ( objecthandle, force )
long objecthandle;
int forct;

FIG. 14B odminvoke () —— 1406 include <odm.h>   1432   1438   1437 int odminvoke ( objecthandle, ucrit, methods_to_do )
long objecthandle;
struct objsrch * ucrit;
struct method_description * methods_to_do;

FIG. 14C odmadd () —— 1408

```
include <odm.h>  1432 int odmadd ( objecthandle, new_values, informat, user_flags, methods_to_do )
                                        1434           1435        1436        1437
long objecthandle;
struct descrip_content * new_values;
int informat;              /* STANZA, COLON, ODM, IBM_INTERNAL_RAW */
int user_flags;            /* EXPAND, NOEXPAND, DO_TO_INHERIT, etc */
struct method_description * methods_to_do;
```

FIG. 14D odmget () —— 1412

```
include <odm.h>  1432 int odmget ( objecthandle. ucrit, user_flags, outformat, methods_to_do, descriptr )
                            1438     1436        1439         1437            1440
long * objecthandle;
struct objsrch * ucrit;
int user_flags;
int outformat;
struct method_description * methods_to_do;
struct descrip_content ** descriptr;
```

FIG. 14F odmdelete () ⟿ 1410 include <odm.h> int odmdelete ( objecthandle, ucrit, user_flags, methods_to_do )  
                              1432      1438      1436          1437  
    long  objecthandle;  
    struct objsrch *ucrit;  
    int user_flags;  
    struct method_description * methods_to_do;

FIG. 14E odmcreate () ⟿ 1414 include <odm.h>   1441      1442 int odmcreate ( classattr, descripattr )  
    struct class_info * classattr;  
    struct descrip_info * descripattr;

FIG. 14G odmdrop () ⟿ 1416 include <odm.h>   1441      1433 int odmdrop ( classattr, force )  
    struct class_info * classattr;  
    int force;

FIG. 14H odmterm () ⟿ 1426 include <odm.h> int odmterm ( )     FIG. 14J

ACCESS CONTROL POLICIES FOR AN OBJECT ORIENTED DATABASE, INCLUDING ACCESS CONTROL LISTS WHICH SPAN ACROSS OBJECT BOUNDARIES

This is a continuation of application Ser. No. 07/352,081 filed May 15, 1989 now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

Application Ser. No. 07/352,074 filed May 15, 1989 in the name of R. J. Archon et al for "An Initial Program Load (IPL) Base On An Object Abstraction For A Data Processing System", abandoned in favor of continuation application Ser. No. 07/806,815, filed Dec. 6, 1991, which in turn was abandoned in favor of continuation application Ser. No. 02/960,180, filed Oct. 9, 1992, hereby incorporated by reference.

Application Ser. No. 07/352,571 filed May 15, 1989 in the name of R. A. Fabbio for "An Open System Management Architecture For A Data Processing System", now abandoned in favor of continuation application Ser. No. 07/878,615, filed Apr. 20, 1992, hereby incorporated by reference.

Application Ser. No. 07/;352,530 filed May 15, 1989 in the name of R. A. Fabbio et al for "An Object Database-Driven Interactive Shell For A Data Processing System", hereby incorporated by reference.

BACKGROUND OF THE INVENTION

1. Field of the Invention

This invention relates to object oriented databases in a data processing system, and more particularly to the use of access control policies for the purposes of granting and revoking privileges to the objects.

2. Description of the Related Art

In a relational database, data is viewed as rows and columns, where a row represents a record, in tables. In order to retrieve records that represent the spanning of multiple tables, relational operators, such as a join operation, are utilized. Although relational operators are used within applications or by users through a query language, these relational operations are not incorporated within the data such that the relational database manager can automatically intuit such relationships. In order to retrieve a record from the database, the user must have read permission for that record. In order to change the data in the record, the user must retrieve (select and fetch) the data into memory, update the record in memory, and then write the updated record to the database. The user must have permission to write the record before the database manager allows the previous data to be overwritten in the database. Moreover, in order to update the record in memory, the user must be cognizant of the column's attributes, such as whether that column contains integers, characters, strings etc.

In an object oriented database, the navigation through the data is similar to that of the network model where an object oriented database manager traverses the relationships defined amongst the objects and subobjects. In contrast to the relational database model, relationships between objects and subobjects are defined through the data, and not through explicit operations. Moreover, in complex application environments, objects and their relationships usually show very complex internal structures and comprise larger number of properties; such properties include methods. In addition, the object oriented database model parallels the object oriented programming model in that one may inherit attributes and methods from predecessor objects. However, the object oriented programming model generally deals with objects that are temporal in nature, i.e., memory resident. The object oriented database model extends the programming model by allowing one to deal with objects that persist, i.e., are disk resident. One of the features of object oriented databases (analogous to the programming model) is to provide the ability to define generic operations, i.e. methods, which apply to the objects, for the purposes of manipulating and retrieving them. In the relational database model, all operations to retrieve and manipulate records are performed by using the database manager's application programming interface or query language. The object oriented methodology insulates the users of the database from the data representation and/or data structures that comprise objects. All retrieval and update operations may be performed through the use of these methods.

Object-oriented database systems allow the semantics of a given environment to be modeled as a set of objects and relationships among them. Moreover, in complex application environments, objects and their relationships usually show very complex internal structures and comprise larger numbers of properties. With today's database systems, which are generally based upon a classical data model (hierarchical, network, or relational), they tend to be tailored to represent rather simple entities, thus resulting in large semantic gaps when dealing with more complex entities. In part this is true because one conceptual entity must be represented by a number of database objects (for example, records, tuples and so on). An object-oriented database system differs in that it offers a data model that allows the user to represent one conceptual real world entity by exactly one object or object class. This implies that an object-oriented model allows entities to be composed of subentities that are entities themselves, including recursive definition. There are several levels of object orientation:

Structurally object-oriented: Allows one to define data structures to represent entities of any complexity.

Operationally object-oriented: Includes generic operators to deal with complex objects in their entirety.

Behaviorally object-oriented: Borrows types from the object-oriented programming paradigm, a data model that incorporates features to define object descriptor types of any complexity together with a set of specific operators (abstract data types).

In summary, an object-oriented database paradigm offers increased modeling power by providing the ability to handle semantically meaningful objects rather than normalized tuples or single records. Such an approach greatly reduces the semantic gap between the real world and the database representation, while at the same time offering a more precise semantic definition of our real world.

In the relational database model, access privileges may be set on the records such that grant and revoke authorization privileges can be determined per user of the database. The records are tagged with either read or write privileges for specific users. For example, the first record could be read by users A, B, and C, and only written by user C. Likewise, the second record could be tagged such that only user A has the permission to read, and only user A has the permission to write.

For example, if a database contained payroll information, members of the payroll department may be able to read all of the payroll information for all departments except the payroll record for their payroll department. Only the manager of the payroll department would have the permission to read the record containing the payroll department data. If a user attempted to retrieve the records which did not define read privilege for the user, that user would not be granted the ability to see that record of data.

One shortcoming of relational databases is that access permission control is on a record basis and does not deal with objects, where objects represent complex entities and specific methods.

SUMMARY OF THE INVENTION

It is therefore an object of this invention to extend the definition of an access control list such that it applies to objects, and spans the objects and subobjects, in an object oriented database.

It is a further object of this invention to apply an access control list to authorize the invocation of an operation on an object for changing the state of the object in addition to the permissions of read and write access.

It is a further object of this invention to facilitate a mechanism whereby access control policies on objects may be inherited from their superclass objects; resulting in the least privilege.

It is therefore a further object of this invention to move the knowledge of each configurable domain into the data by using an object oriented database; thus providing a set of facilities extendable in the field.

In the system and method of this invention, grant and revoke permissions, referred to herein as access control lists, expand the boundaries to a collection of objects in an object oriented database. An object data manager supports composite objects which are multiple objects and the access control policies that apply to such objects transparent to the user. The access control lists span across the objects. Furthermore, not only does the access control lists provide read and write permissions, but also provides execution permission for operations which apply to the objects. The execute semantics apply to methods that are invoked to perform operations on the objects. A user with execute permission can perform operations on those objects.

For example, if the objects in the object oriented database contained information on the configuration of a data processing system, a user could be either granted or revoked the permission not only to read and write the configuration data, but also to perform configuration operations on the data. If the configuration information contained information on the physical devices in the system, the user would be granted or revoked the permission to configure, define, start, stop, unconfigure, and undefine those devices.

Each entry in the access control lists of this invention can contain access control information for either users or groups of users specified by the corresponding user ids or group ids. The access control list has the information necessary to determine the privileges of read, write, or execute for a set of users or groups. Furthermore, upon receiving a list of user ids and group ids, the access control check routines perform a logical AND operation across the set of credentials represented by the different ids and returns the least amount of privilege.

The system and method of this invention provides a layered environment which spans from the task-based user interface to the low level functions of an operating system across all of the configurable domains of a system. The task-based user interface is geared toward the end-user and not the operating environment. The system and its configurable domains are described in a uniform and robust fashion by using an object-oriented paradigm. Since, the techniques used are extendable, the end user can add to their system management environment in any of the different layers of this invention.

The set of configurable domains encapsulated by the architecture are: (1) Devices (disks, printers, terminals and so on); (2) Filesysems/Logical Volumes; (3) Network Nodes; (4) Users and Groups; (5) Queues; (6) Subsystems; and (7) Error Reporting and Problem Management, etc.

The System Management Architecture is based on two key concepts. First, the architecture is highly open and extendable. By being open, a user can readily insert and remove the various aspects of the system management product. Second, the architecture uses an object paradigm for representing the description of the system, independent of its network context.

To provide extendibility, a number of distinct architectural layers were created. These layers are:
User interface
High-level commands
Methods
Low-Level commands/calling interfaces
System Management Services (provided by the Object Data Manager, kernel and so on)

The user interface layer is completely separate from the functions, tasks, and commands that provide the user tasks. To that end, the user is free to provide any user interface desired to represent the different tasks. The high-level commands layer, also referred to as the task layer, is executable entities which provide high level functions. A user is able to add and remove any of the high level commands which allows the user to customize the functions of the tasks which the user may need to utilize. Consequently, a user can add to or delete from the user interface to reflect the new or deleted tasks.

The methods layer views all of the entities in the system as objects. Given that there are objects, the methods define operations and actions that are to be performed on each object. As an example, in the area of devices, all of the devices including real devices and logical devices, are viewed as objects. Methods are used to define and undefine, configure and unconfigure, start and stop, each of the objects within the system environment. The objects are executable entities which perform particular operations that apply to the particular objects under consideration. For example, if a user wants to start an object of type printer, the method to start the printer is invoked. The methods embody low level functions necessary to perform the operations against the object.

Since all of the layers of the system of this invention are open and extendable, a user can easily add methods, objects, and corresponding changes to a user interface to manage system components which were not originally provided for, such as by the manufacturer of the system management product. For example, if a user wanted to include a printer into the system which was not originally provided for, a user could add to the user interface the configuration of the printer, the user could add tasks that would ad, delete, change, and show the printer, the user can then write the methods that apply operations to the printer object by utilizing the next layer of this invention, the low level commands.

The system management services include the kernel of the operating system, system libraries, system calls, and the object data manager.

The system and method of this invention also provides a single data representation across all of the configurable domains. The object oriented representation, i.e. data structure, provides a uniform and consistent representation of all of the data in all of the configurable domains. A configurable domain represents its data through the object storage an internal representation such that the configurable domain can access and retrieve the data appropriately. All configurable domains are reading and writing through the same interface.

BRIEF DESCRIPTION OF THE DRAWING

FIG. 2B is an illustration of an access control list for each object in an object database.

FIG. 12 illustrates an object class linked to other object classes in the object oriented database for the configurable domain involving devices.

FIG. 13 shows the structure of a method.

FIG. 14A shows the odmopen interface for opening an object class.

FIG. 14B shows the odmclose interface for closing an object class.

FIG. 14C shows the odminvoke interface for invoking a method for a specified object.

FIG. 14D shows the odmadd interface for adding a new object to the object class.

FIG. 14E shows the odmdelete interface for deleting an object from an object class.

FIG. 14F shows the odmget interface for retrieving an object from an object class.

FIG. 14G shows the odmcreate interface for creating an empty object class.

FIG. 14H shows the odmdrop interface for removing an object class.

FIG. 14I shows the odmchange interface for changing the contents of an object.

FIG. 14J shows the odmterm interface which notifies the object data manager that no further ODM functions will be used.

DESCRIPTION OF THE PREFERRED EMBODIMENT

Figure 1:
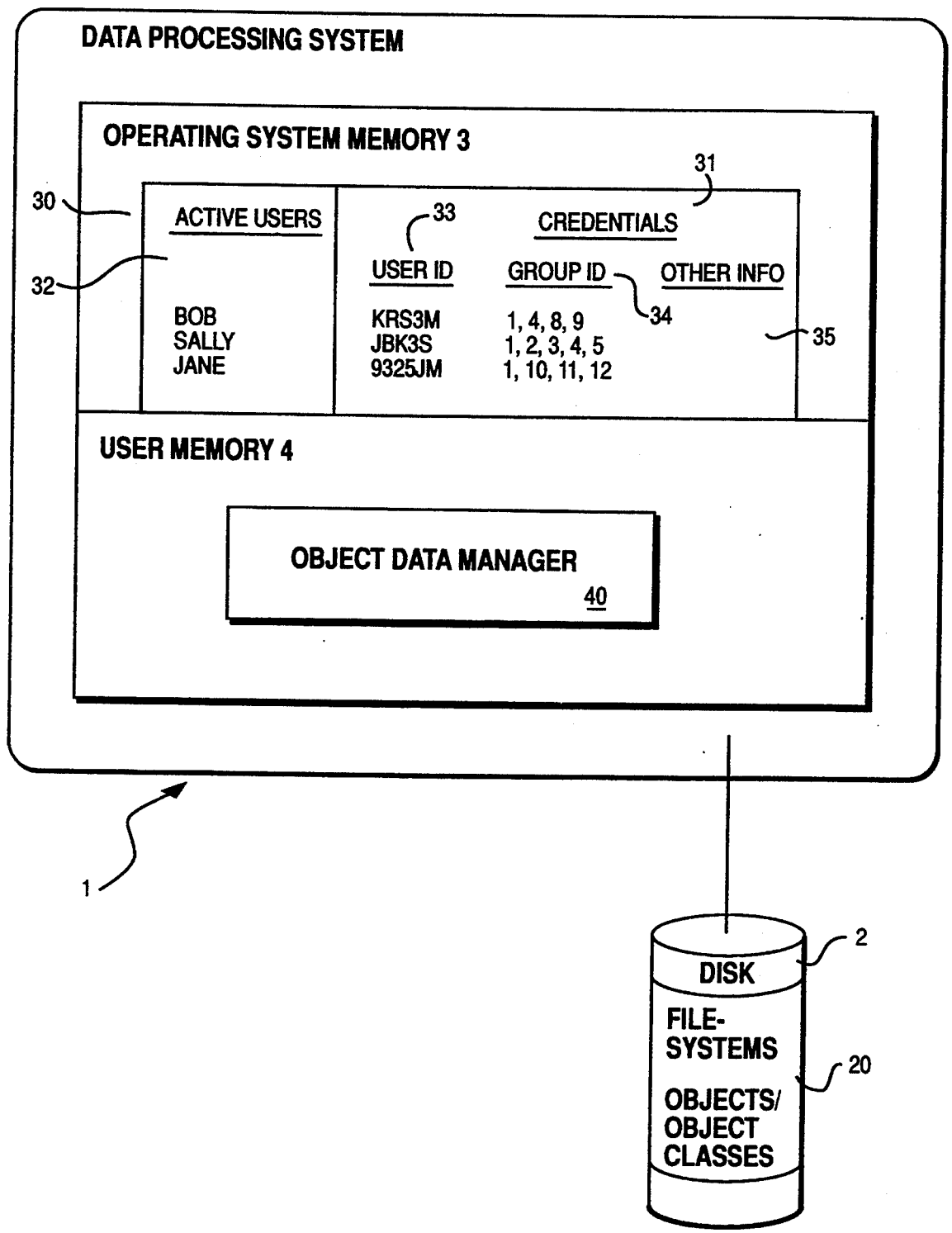
FIG. 1 is a block diagram of the system of this invention having an object data manager for controlling the access to objects in an object database according to an access control policy associated with the objects and the user's credentials.

The data processing system 1 has an operating system running in memory 3 which has tables 30 which contains the credentials 31 for each active user 32. The credentials identity 31 contains the user id 33, and the group ids 34 for which the user belongs and other security information 35. In user memory 4, the object data manager 40 accesses the objects found in the file system. The file system 20 resides on disk 2 which has object classes 50, as shown in FIG. 2A and FIG. 2C.

Figure 2A:
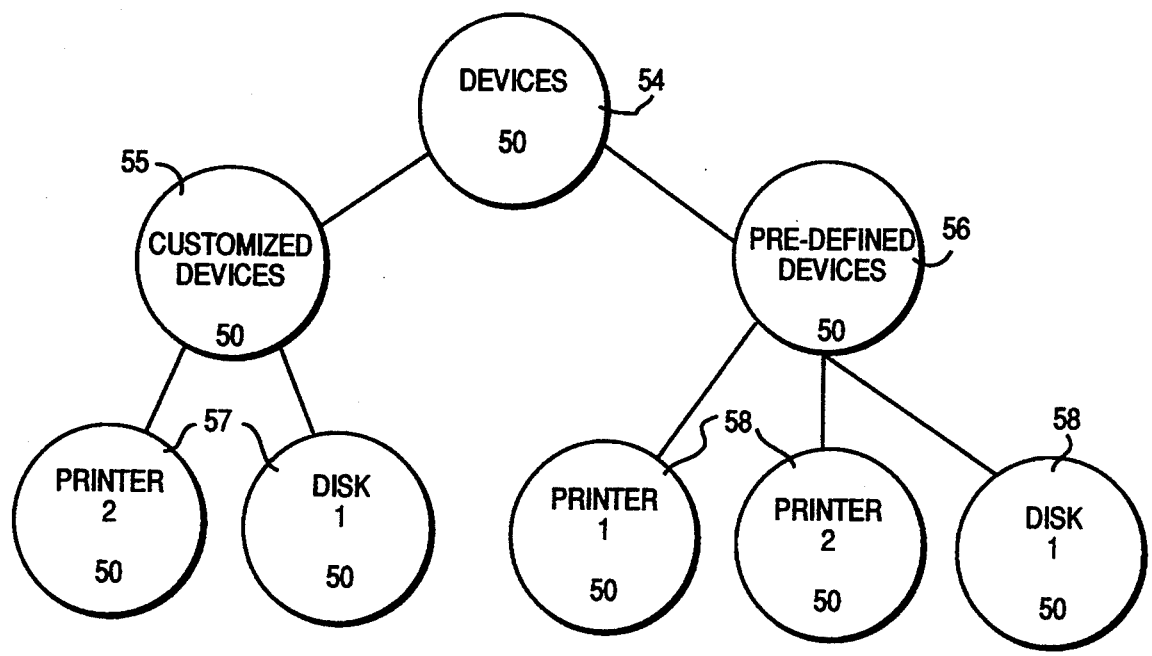
FIG. 2A is a hierarchy of objects in an object database showing superobjects, objects, and subobjects.
Figure 2C:
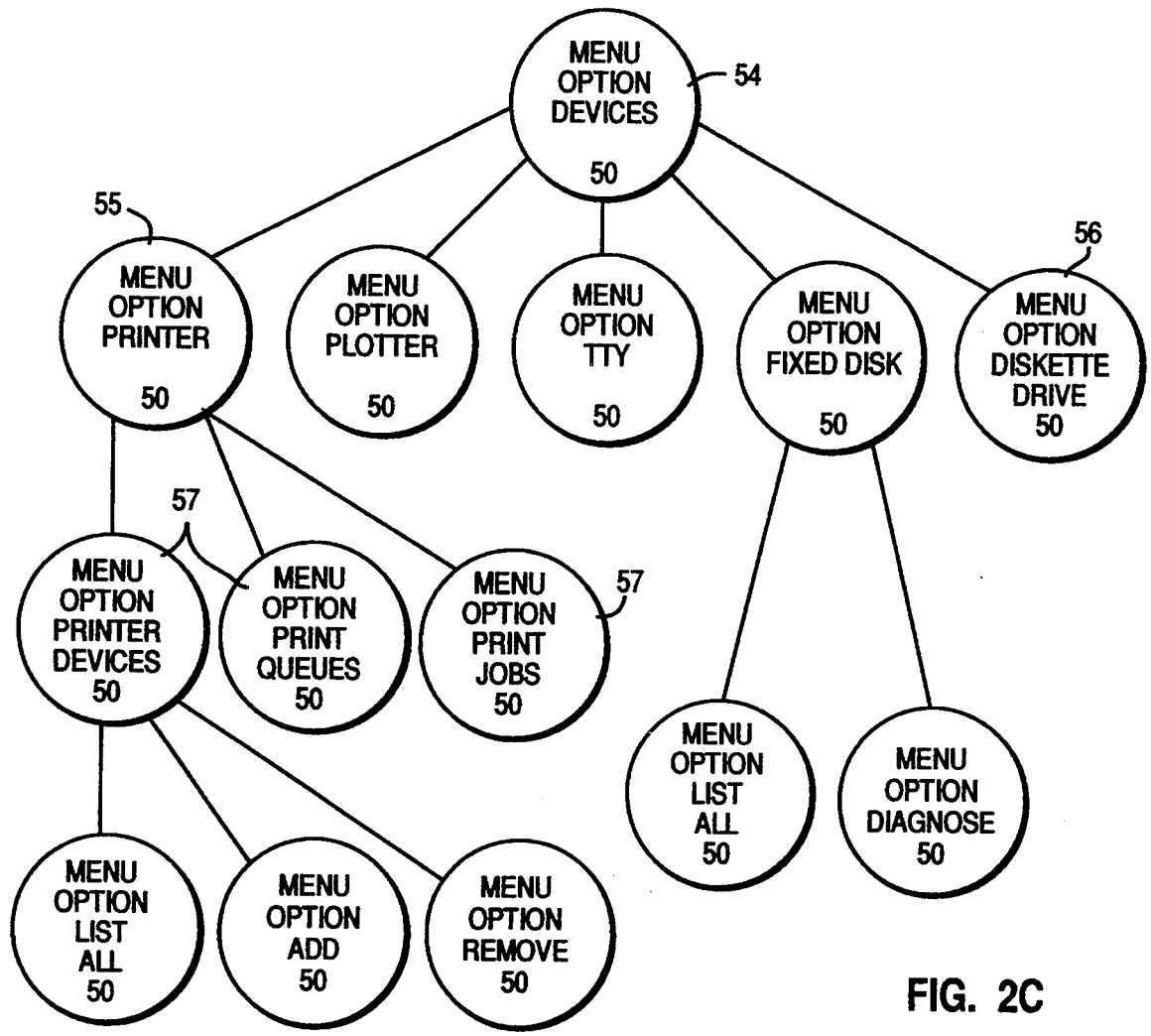
FIG. 2C is a hierarchy of interface menu objects in and object database showing superobjects, objects, and subobjects.

Referring to FIG. 2A, the object class devices 54 is further described with reference to commonly assigned copending patent application Ser. No. 07/352,571 filed May 15, 1989, in the name of R. A. Fabbio, for An Open System Management Architecture For Data Processing Systems, now abandoned in favor of continuation application Ser. No. 07/871,615, filed Apr. 20, 1992, herein incorporated by reference. Object class 54 is a super class of objects 55 and objects 56, and objects 55 is a superclass of objects 57. Likewise, objects 55 are a subclass of object class 54, and object classes 57 are subobjects of object class 55. The object class of the system management interface tool comprises interface menu option objects, as shown in FIG. 2C, and is further described with reference to commonly assigned copending patent application Ser. No. 07/352,530, filed May 15, 1989, in the name of R. A. Fabbio et al, for "An Object Database-Driven Interactive Shell for a Data Processing System" herein incorporated by reference Referring back to FIG. 1, the object data manager 40 is cognizant of absolute access control policy assignment and authorization per object. The authorization process reviews the user's credentials 31 described to the object data manager 40 and uses this information to determine the operations which are permissible on each object.

When the object data manager is requested to perform operations on specific objects, i.e. retrieve or modify, the object data manager first determines the current credential attributes 31 for the user 32 requesting the operation by interfacing with the kernel 3. The object data manager then performs the operation which may require inheritance or subclass traversal through the objects. As the object data manager performs such an operation, the access control policies lists are checked for each object satisfying the criteria of the operation. Access control policies are treated like other attributes within an object class in that they may be inherited from other superclasses, thus altering the access control policies as traversal of the objects is performed.

FIG. 2B represents a user defined view of the devices object class 54 and one of its subclasses, customized devices 55. Devices object class 50 contains attributes 71, methods 72 and triggers 73. For example, for an object class of customized devices devices 55, the attributes 71 would represent the definition of the object such as device name 74 character string, device id 75 integer number, and device type 76 character string, etc. The methods 72 are the operations that apply to the object. For example, a method of configuring the device 77, the method of defining the device 78, the method of unconfiguring 79, and the method of undefining 80 the object, etc. Triggers 73 represent the events that are automatically invoked when the objects are manipulated.

Figure 4:
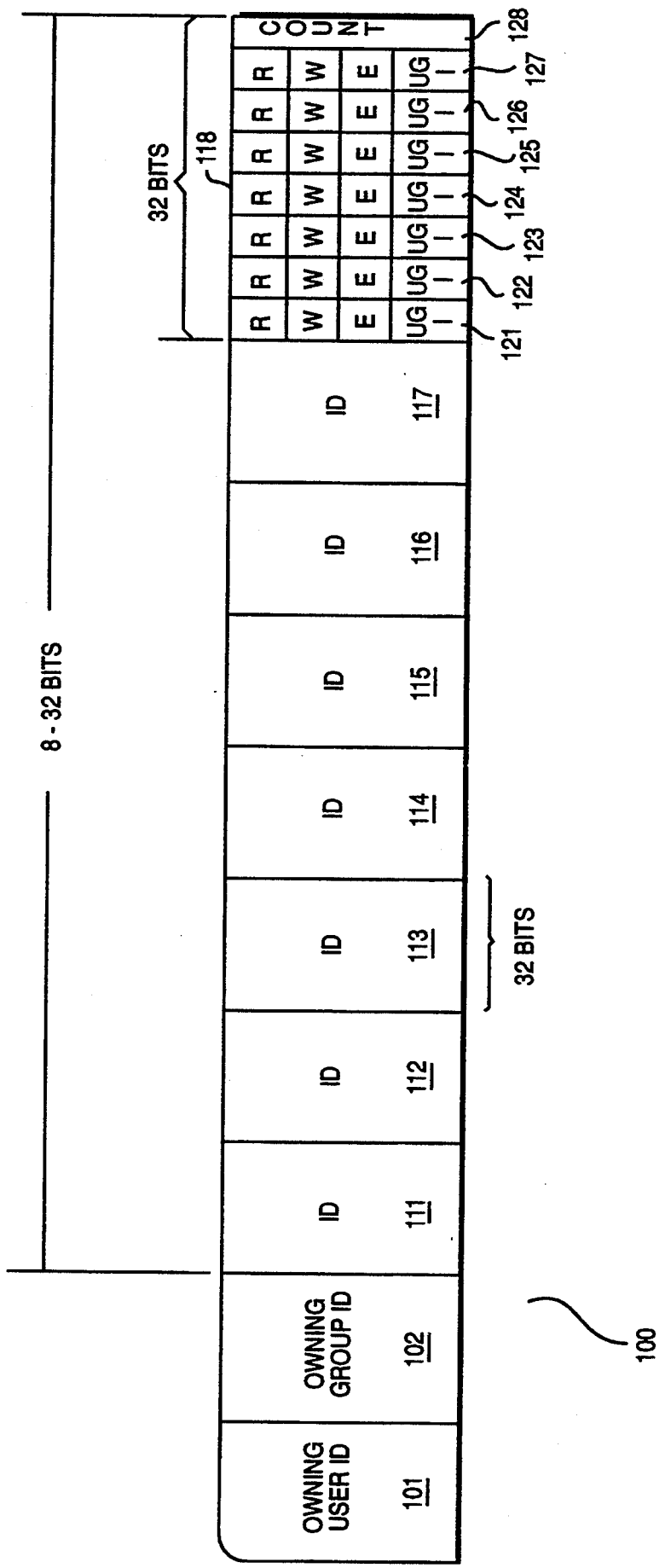
FIG. 4 illustrates the structure of the access control list.

In addition to the user defined attributes 71, the object data manager transparently maintains a separate access control list 100 as part of each object within each object class. The access control list is further shown in FIG. 4. The access control list 100 maintains the owning user id 101 and the owning group id 102 for each object. This owning information 101,102 dictates the access control policy for maintenance to the access control list itself. Only those owning users and owning groups can alter the access control list in an object. Before any access control entry is altered for any object, the object data manager first verifies that the user can be identified through its credentials in either the owning user id 101 or the owning group id 102.

The access control attributes on each object consists of eight 32 bit entries 111–118, of which seven of these entries 111–117 represent the user or group ids making up the access control list 100. The eighth entry 118 is divided into eight 4-bit slots 121–128, where the first seven slots 121–127 represent the privileges associated with the corresponding access control entry 111–117. The eighth 4-bit slot 128 is used to keep the count of the number of entries used. In the first seven 4-bit slots 121–127, the first three bits represent read, write, and execute privileges while the last bit of the 4-bit slot indicates whether the corresponding access control entry applies to a user or a group id.

Figure 3A:
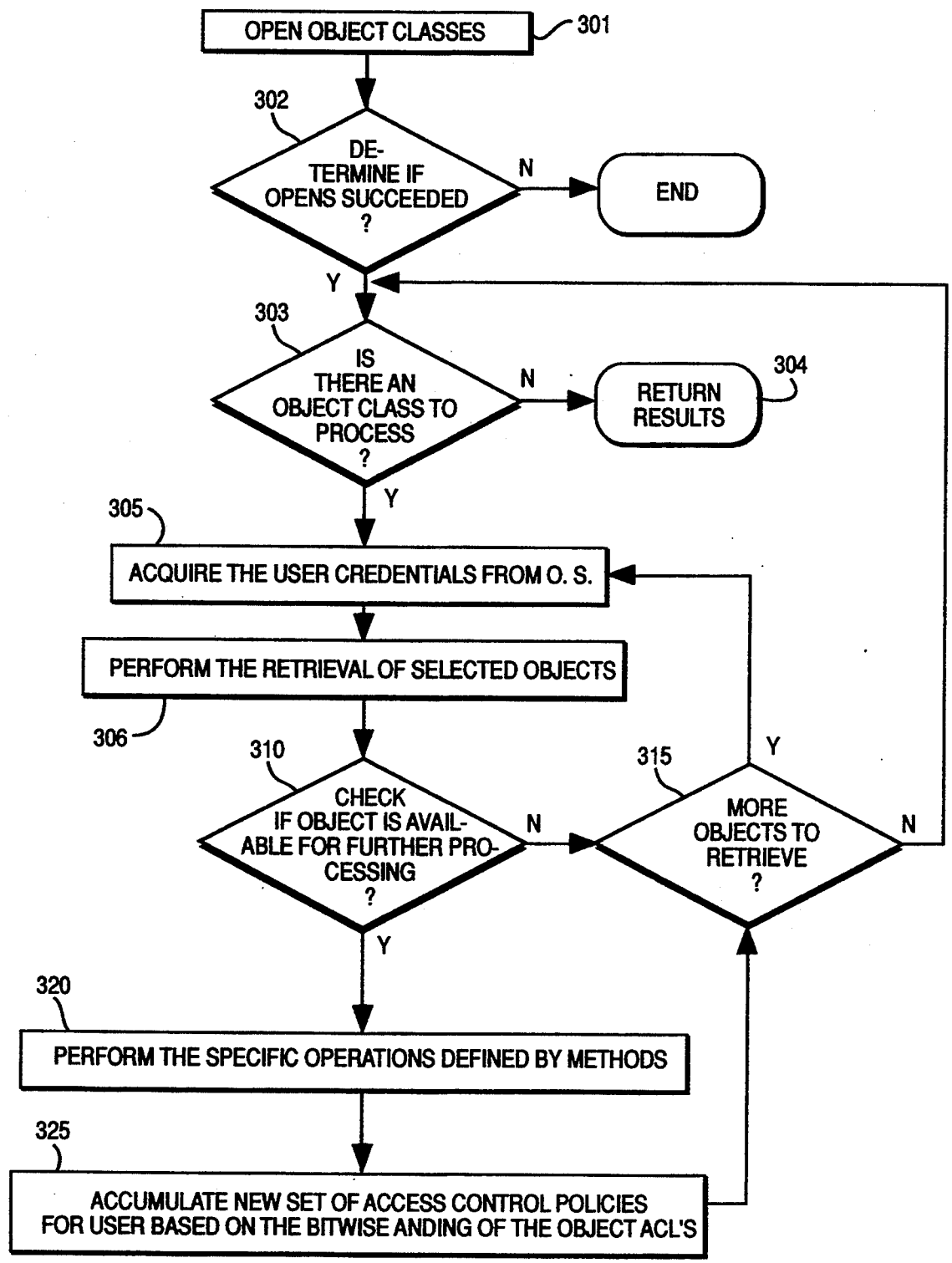
FIG. 3A is a flow diagram of the object data manager utilizing the access control facilities to determine whether a particular operation against a set of object classes and objects are permitted.

FIG. 3A illustrates the high level flow of the object data manager utilizing the access control facilities to determine whether a particular operation against a set of object classes and objects are permitted. The object data manager opens the appropriate object classes, step 301, and determines if the open succeeded, step 302. The object data manager then iterates for each object class that was opened, step 303. When the list of object classes opened are processed, the results are accumulated and returned to the user, step 304. If there are object classes to process, the object data manager acquires the user's credentials from the operating system (resultant is the least privilege associated for that user based on the set's credentials), step 305. The object data manager then performs the retrieval of the selected objects, step 306, and checks to see if the object is available for further-processing, step 310, specifically whether the access privileges for the user do not conflict with the access controls assigned to the object being accessed. Specifically, the object data manager checks in the operating system for the credentials for the user, and checks these credentials with the list of access control privileges defined by the objects retrieved. If the access privileges are denied, the object data manager then checks to see if there are more objects that meet that selection criteria, step 315. If so, the object data manager returns to step 305. If not, the object data manager returns to step 303. Given that the object holds the appropriate access controls for further processing, step 320, the object data manager performs the specific operations generally defined by the methods. The object data manager accumulates the new set of access control information for the user based on the bitwise ANDing of the object's access controls, step 325 and returns to step 315 to determine whether there are more objects to retrieve. In step 325, the object data manager uses this technique to inherit the least access privilege that spans the objects of interest.

Figure 3B:
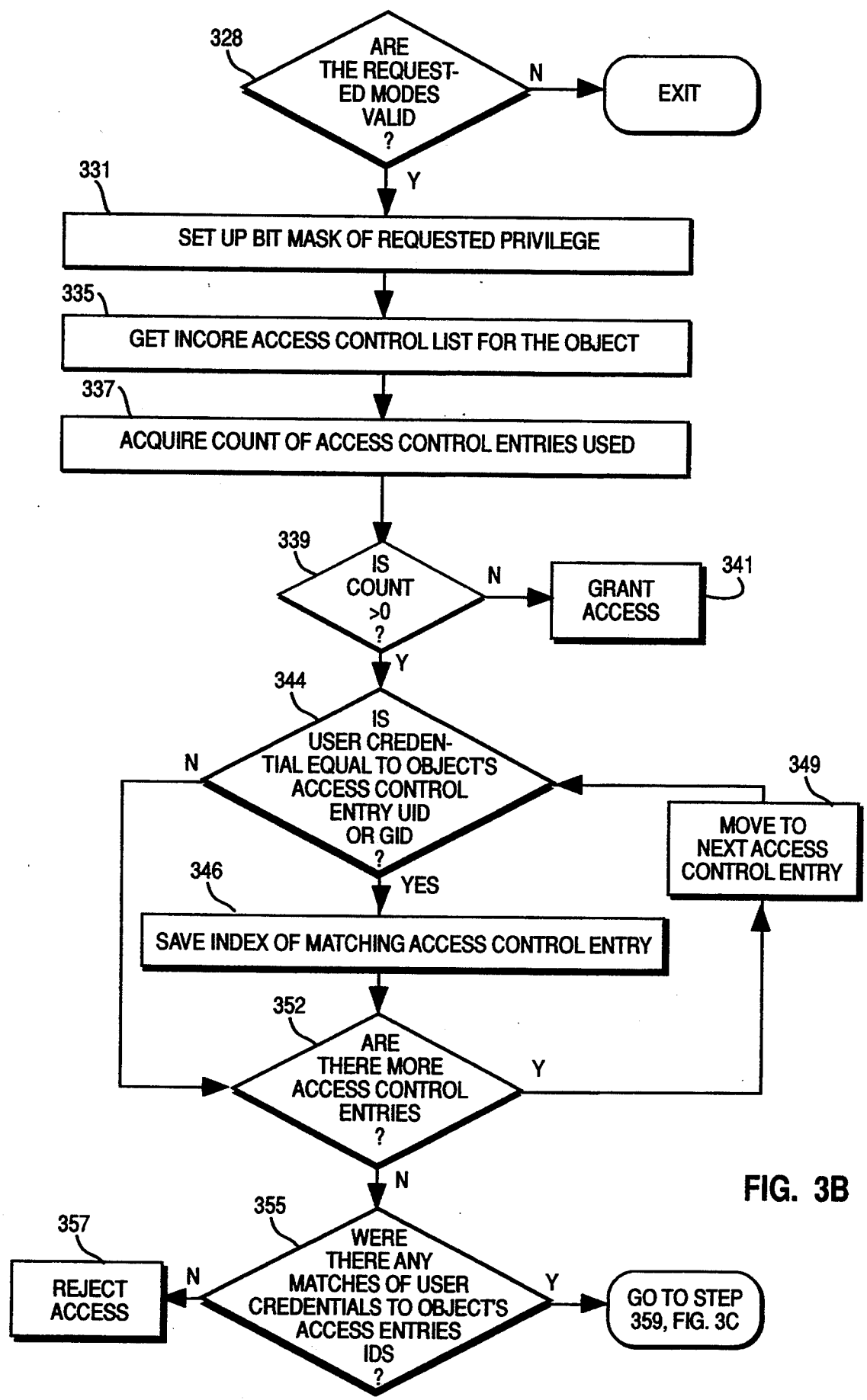
FIG. 3B is a flow diagram of the methodology for granting or revoking the operations based on the access control policies.
Figure 3C:
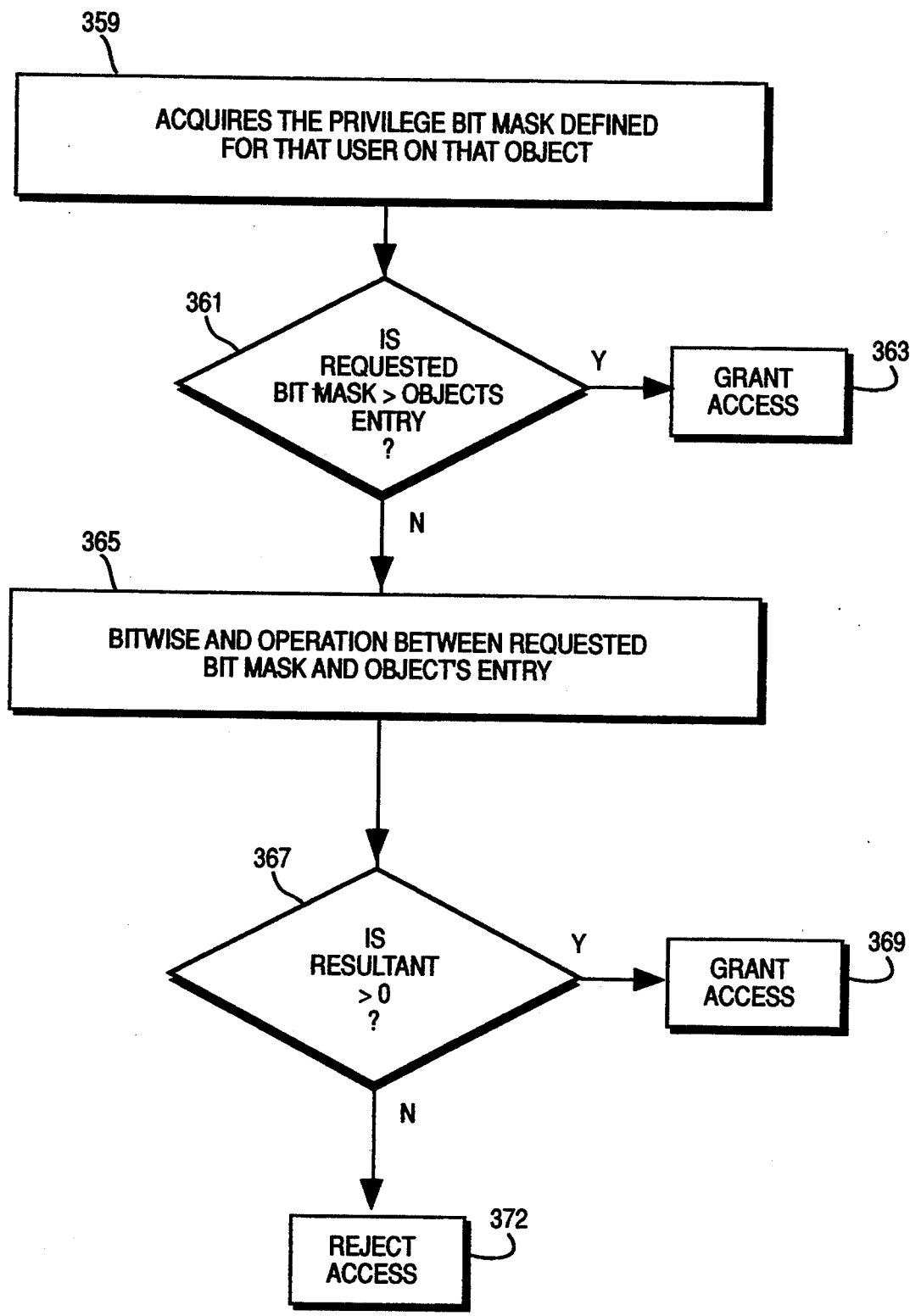
FIG. 3C is a continuation of the flow diagram of FIG. 3B.

FIG. 3B describes in more detail step 310 from FIG. 3A which describes the methodology for granting or revoking the operations based on the access control policies. The access control facility first determines whether the requested modes supplied to it are valid, step 328. Given that the modes are valid, the object data manager defines a bit mask which is representative of the requested modes, step 331. In addition, the object data manager accesses the in memory version of the access control list assigned to a particular object, step 335. Once the access control list has been acquired, the object data manager determines the number of entries utilized within the list, step 337. If the count is not greater than zero, step 331, the object data manager grants access to the object by the user, step 341. If the count is greater than zero, the object data manager compares the user's credentials to the access control entry representing either a user or a group, step 344. If there is a match, the object data manager saves the index of the matching access control entry, step 346. It then checks to see if there are additional access control entries, step 352, and if so, returns to step 344. If additional entries do not exist, the object data manager determines if there were any matches between the user's credentials and the object's access control entry, step 355. If there are none, the access is denied to the object for that user, step 357. If a match exits, the object data manager acquires the privilege bit mask defined for that user on that object, step 359, FIG. 3C. The object data manager then checks to see if the requested bit mask is greater than the user's bit mask defined by the access control entry within that object, step 361. If the requested bit masks is greater, then access is granted to the object for that user, step 363. If the requested bits are less than or equal to, then a bitwise AND operation is performed between the requested bit mask and the bit mask found in the objects entry for that user, step 365. If the resultant is greater than zero, step 367, then access is granted to the object for that user, step 369. If the resultant is less than or equal to zero, then access is denied to that object for that user, step 372.

If a particular user is associated with multiple groups, and identifies oneself with multiple groups when performing operations on the objects, the object data manager will perform a bitwise AND operation of the particular sets of credentials that are currently associated with that user. This results in a assigning the least privilege associated with the intersection of the credentials sets.

The above described access control policies can be applied to various applications. One such application of this invention is described in commonly assigned copending patent application Ser. No. 07/352,530, filed May 15, 1989, in the name of R. A. Fabbio et al, for "An Object Database-Driven Interactive Shell for a Data Processing System" herein incorporated by reference. The access control lists of this invention can be applied to a system management interface tool for the purposes of defining the authorization policies for the various views that may be accessed by a collection of system administrators with various authorities. Without this invention, one approach would be to define the collection of menus, dialogs, and prompts to represent the permutations of the various administrative views associated with the different administrative privileges. However, this technique typically results in very large databases containing a great deal of redundant information.

In contrast, with the present invention, the various menus, dialogs, and prompts are only stored once in the object database, and are assigned the appropriate access controls on the various objects (menus, dialogues, prompts) such that the various permutations of administrative views are dictated by the access control policies.

Figure 5A:
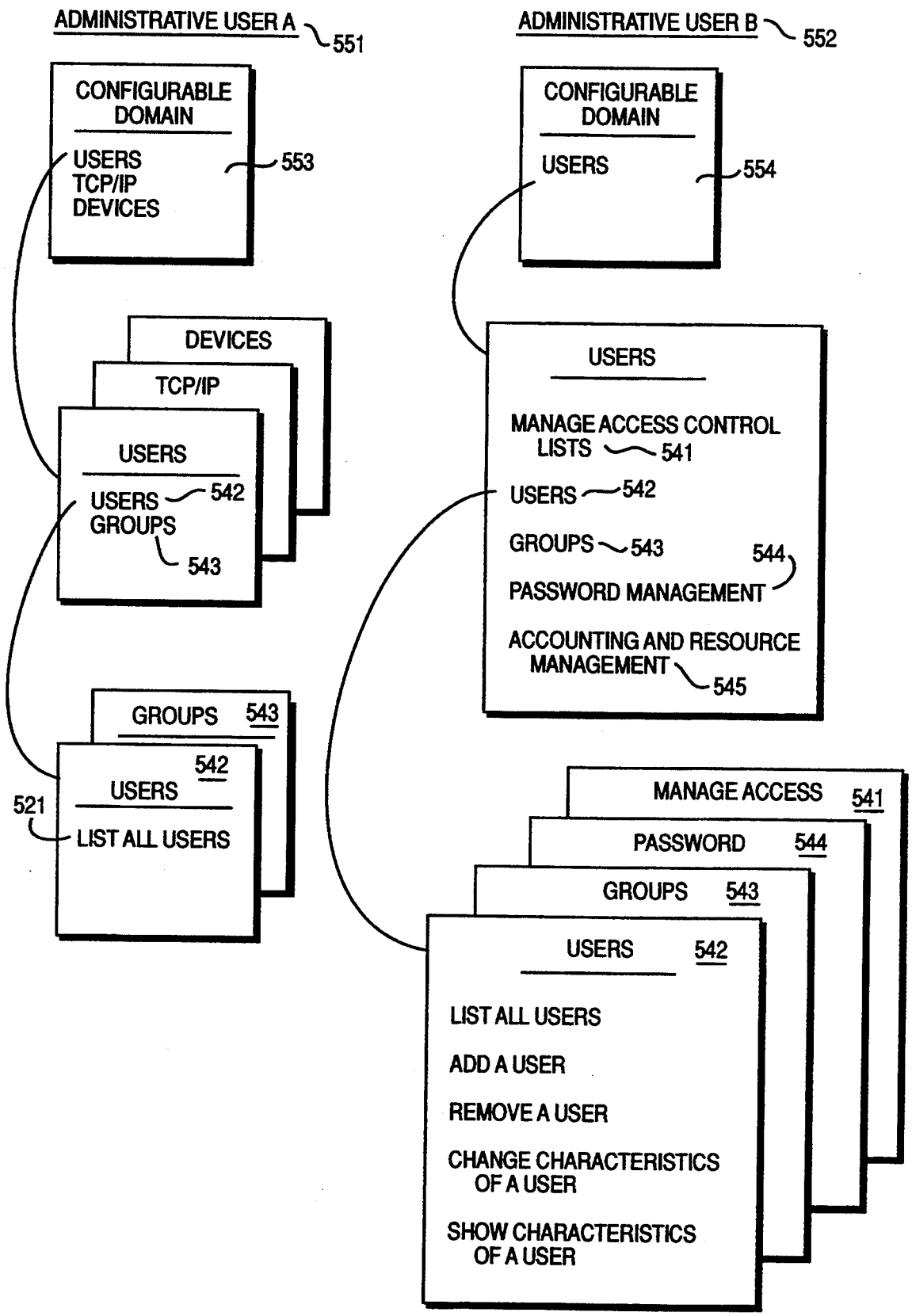
FIG. 5A shows the access control policy of this invention used in conjunction with a system management interface tool for controlling the administrative views of menu objects.
Figure 5B:
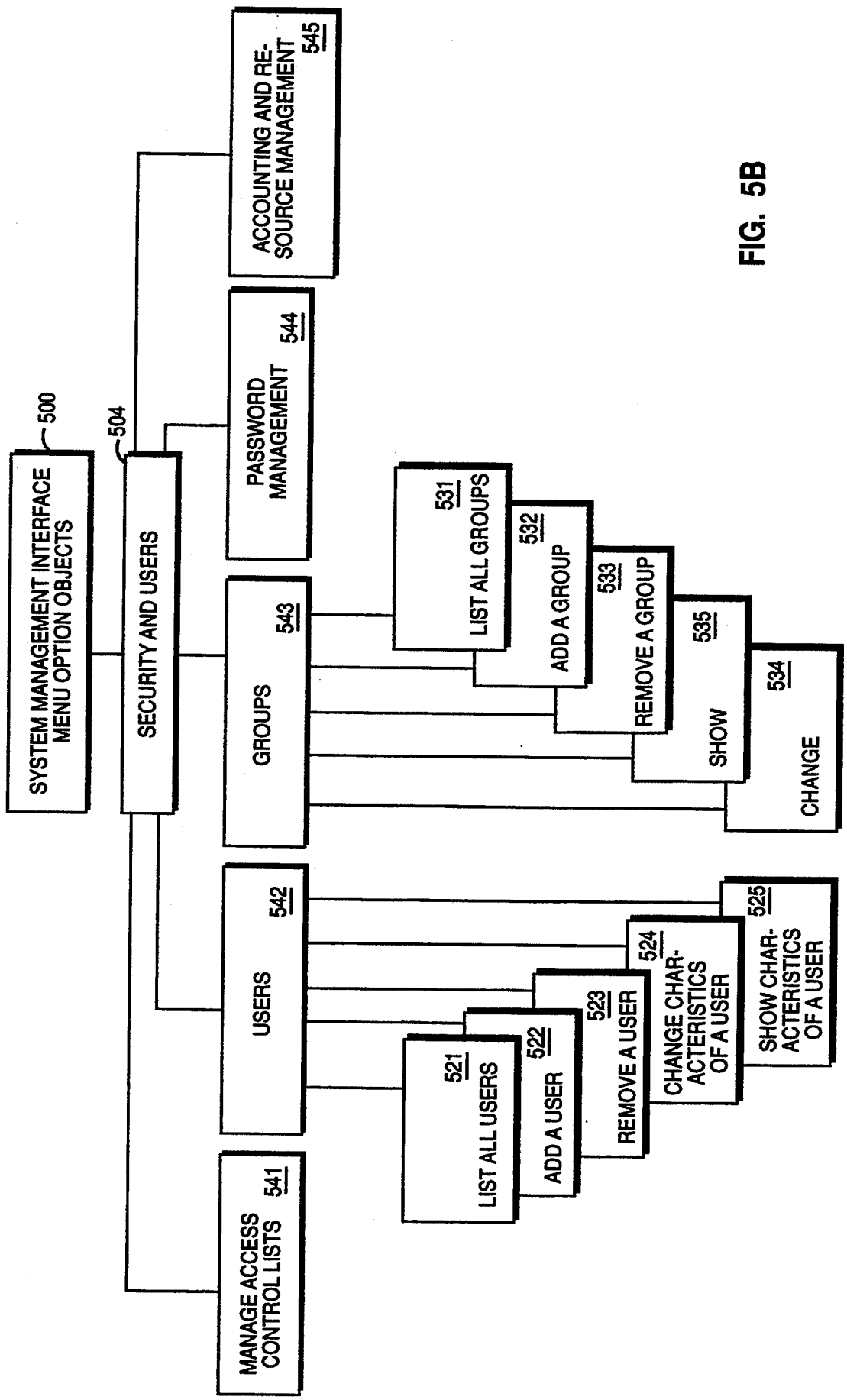
FIG. 5B shows a hierarchy of system management interface menu option objects.

For example, FIG. 5B shows a hierarchy of interface menu option objects for performing system management tasks, 500. Along with security and users, 504, other subclasses of system management interface objects include devices, TCP/IP, physical and logical storage, communications applications and services, problem determination, etc. As shown in FIG. 5A, administrator A, 551, may have read, write, and execute privileges for the user interface objects 553 which present the configurable domain of TCP/IP, devices, and users while administrator B, 552, may have read, write, and execute privileges for the user interface objects which present the configurable domain of just users, 554. However, administrator A, 551, may only have the privilege to access to view the users 542 and the groups 543, while administrator B, 552, has access to view and manage the access control lists, 541, the users 542, the groups, 543, and passwords, 544. Therefore, administrator A would only have access to menus 542,543, while administrator B would have access to menus 542,543,544,541 as the subobjects of the configurable domains menu object class for users.

The system management architecture of this invention is based on two key concepts. First, the architecture is highly open and extendable. Second, the architecture uses an object paradigm for representing the description of the system, independent of its network context.

Figure 6:
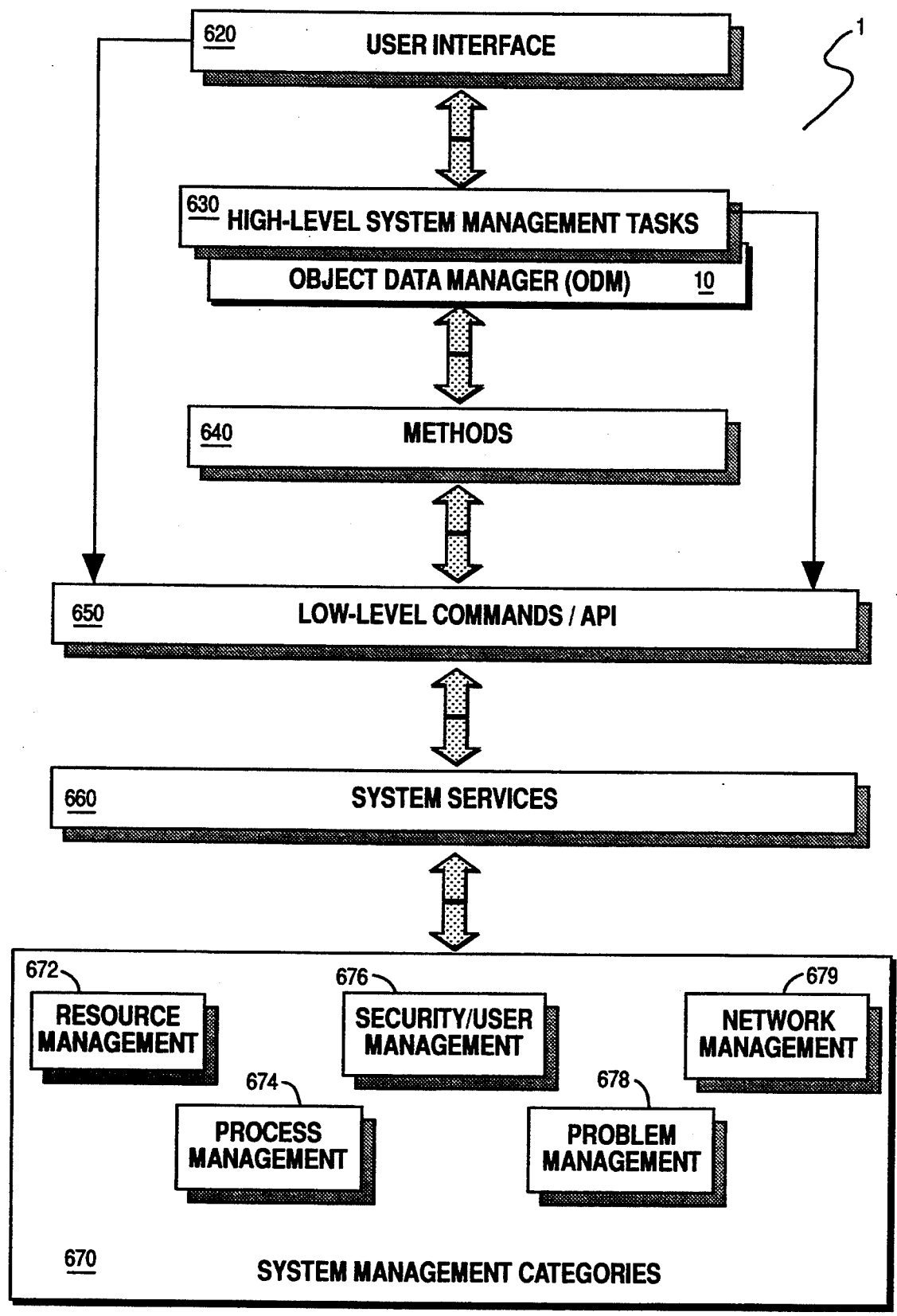
FIG. 6 shows a block diagram of the layers of the system management architecture of this invention which provide an open and extendable facility.
Figure 8:
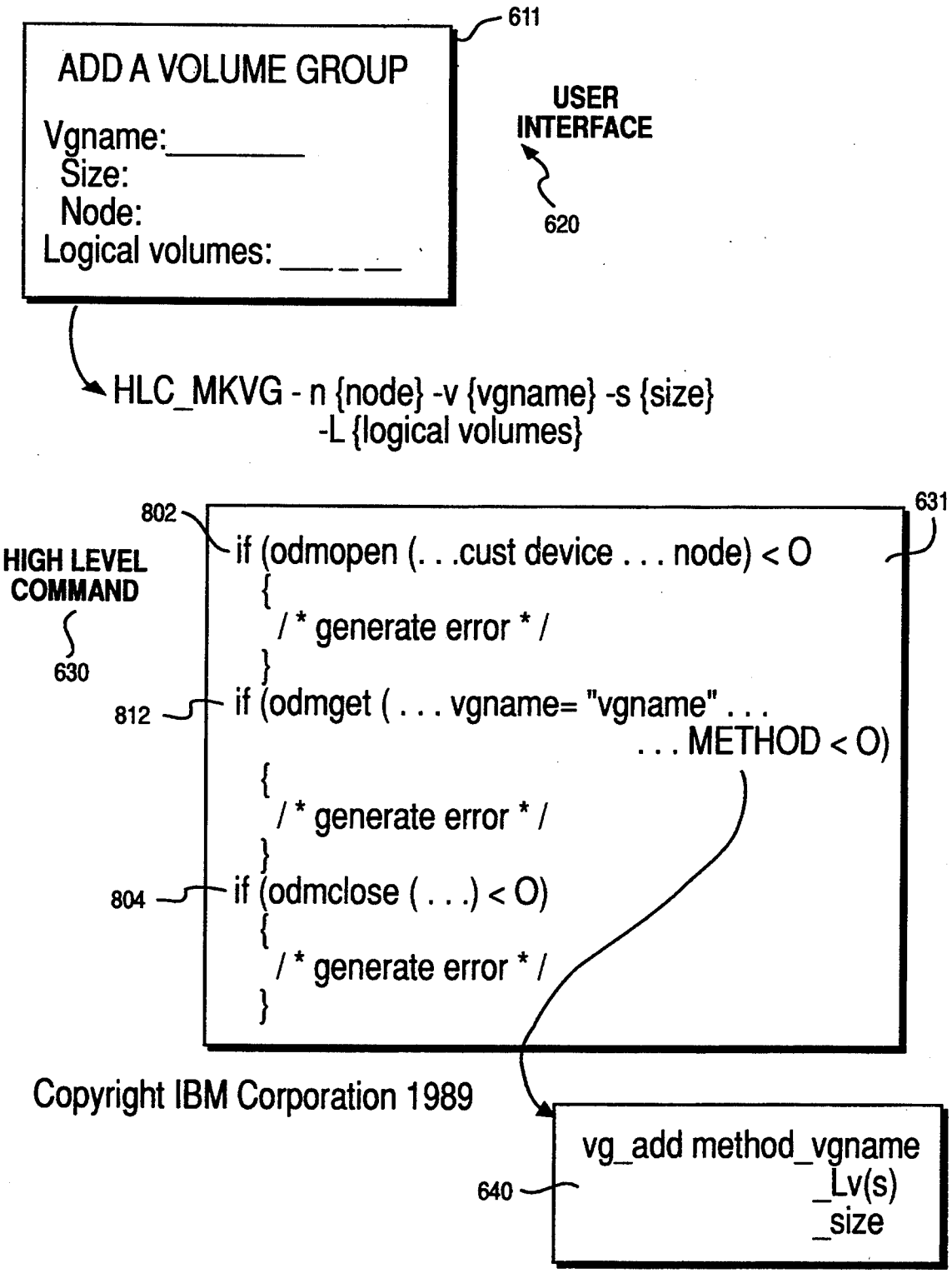
FIG. 8 shows how the layers are loosely coupled to each other in performing a specific task on an object class.

FIG. 6 outlines the layers of the system management architecture of this invention which provide an open and extendable facility. The user interface 620 is the windows, icons, menus, prompts, and choices presented to the user for the purposes of providing system management tasks. An illustration of a possible user interface menu 611 is shown in FIG. 8. The user interface 620 will collect the correct flags, parameters, and options and invoke the appropriate high-level command 630 to perform the desired task. The user interface level 620, has means for adding to the interface including adding menus, dialogs, and the corresponding commands. The System Management Interface Tool (SMIT) is disclosed in a commonly owned copending patent application Ser. No. 07/352,530 filed May 15, 1989 in the name of R. A. Fabbio et al for "An Object Database-Driven Interactive Shell For A Data Processing System", which is hereby incorporated by reference. The System Management Interface Tool runs on al terminals. The interface called Motif was originally developed through Digital Electronics Corporation and Hewlett Packart and is being developed by the Open Software Foundation. The Motif-based User Interface will be used with high function graphics terminals. The fundamental point is that the user interface is an interchangeable entity within the system management architecture of this invention. Other presentation technologies may be substituted by the end-user/OEM community if they so desire without disrupting the other layers of the system management facility of this invention.

High-level commands 630, referred to as system management tasks, effectively provide a sophisticated, complex function geared toward the end-users point of view and not the operating environment. Each high-level command 630 is written as a program or shell script 631. FIG. 8, following the argument syntax and rules as defined by POSIX 1003.2 Section 2.8, which are herein incorporated by reference. The high-level commands 630 execute any number of methods 640 and low level commands 650 in order to complete each user task. Because each high-level command 630 invokes methods 640 through the Object Data Manager (ODM) 610, the high-level commands 630 may be written in a network insensitive fashion to perform generic user tasks, independent of the network context of the object(s) to be manipulated. The essence of this layer 630 is that the user/administrator may develop any number of system management tasks and introduce them easily into the system. Note that high-level commands 630 may be invoked from the shell 631, FIG. 8, without a sophisticated user interface 620. The high level commands can be either in shell script or a C program. Effectively the high level commands perform tasks. In the process of performing these tasks, the high level commands invokes methods.

Methods 640 are operations that apply to objects managed by the object data manager 610. The object data manager 610 provides the ability to associate operations to particular objects, thus providing the notion of "active" data. A method 640 is an executable program 641. The emphasis is for methods 640 to be entities that invoke a variety of low-level commands or low level functions 650 and other facilities that perform specific operations on specific objects. The object data manager 610 acts as a passive participant in the process and passes any or all text and return codes generated form the low-level commands 650 back to the application (high-level command 630) so that they may be diagnosed and reported. It is important to note that the high-level commands 630 invoke methods 640 representing operations that apply to a particular object, independent of the location of the object. Furthermore, new methods 640 may be created and associated with objects at any time.

Methods are operations that apply to the objects that are being manipulated and/or configured. The methods are invoked through a method interface which is defined by the object data manager. The object data manager interface defines the method which needs to be invoked, optional arguments that are to be passed to the method, and pointers to the stderr and stdout buffers. The methods themselves can also generate output. The methods invoke commands and low level functions. The commands and low level functions also generate output which is returned to the methods, the methods return the generated output to the high level commands, and the output from the high level command is returned to the user interface which managers the output. Therefore, there is a synergy between the layers as output is returned.

Low-level commands/interfaces 650 are fundamental. They typically provide simple, stateless, atomic operations and are quite often mapped on top of system level services 660, device drivers or subroutines, as executable entities. The low-level commands 650 are called by both methods 640 and high-level commands 630 and are written following the argument syntax and rules as defined by POSIX 1003.2 Section 2.8. Moreover, for those methods 640 which are written in the C language, the application programmer interface (API) 620 for each low-level command 650 is also available.

System Management Services 670 include system calls, subroutines, device drivers and utilities provided by the kernel, Object Data Manager, Logical Volume Manager, configuration, etc., which support the low-level commands/interfaces 650 and their function.

Figure 7:
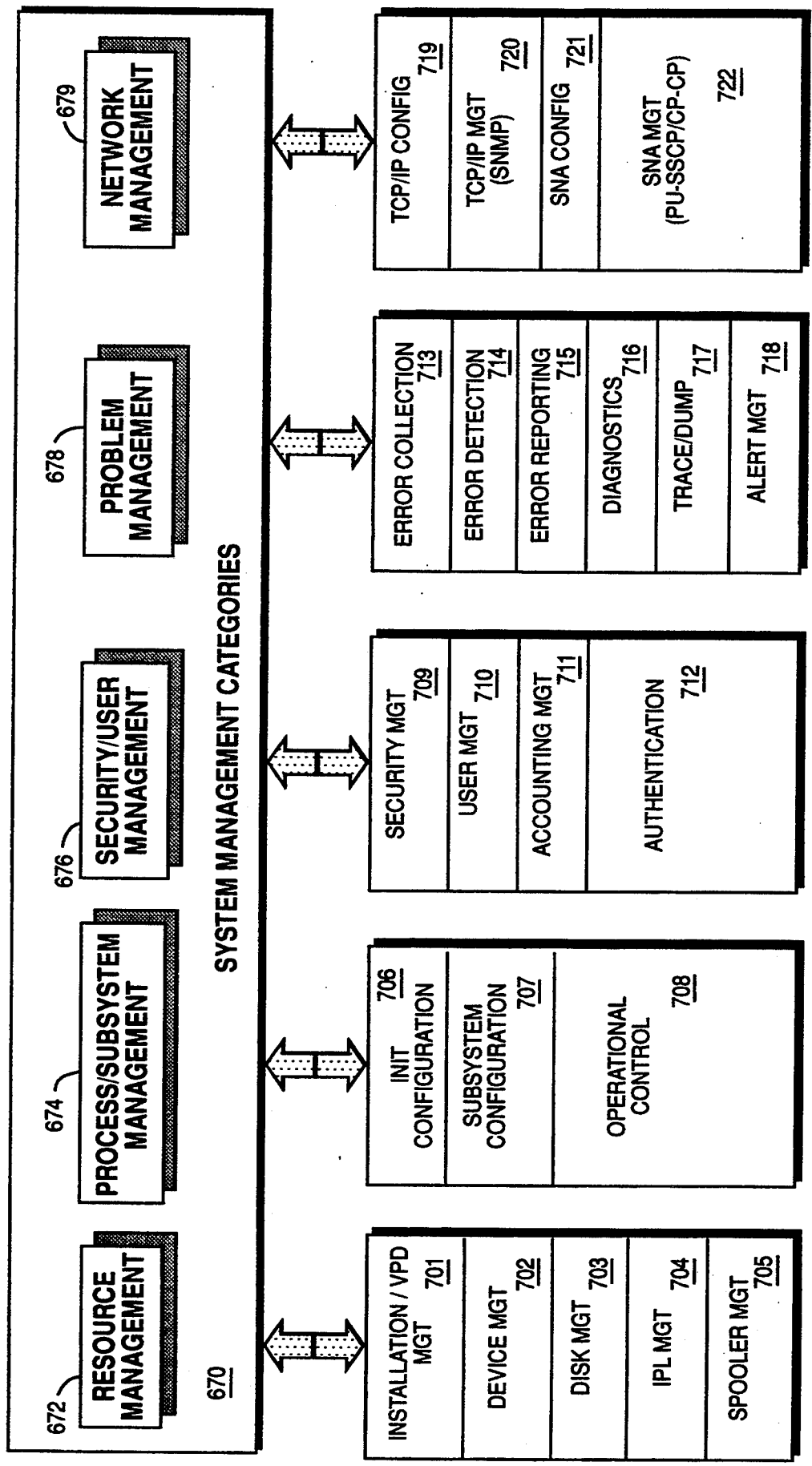
FIG. 7 shows the system management architecture of this invention across configurable domains.

With the rich set of functions offered by the object data manager 610, each of the configurable domains 701-722, FIG. 7, may be represented, resulting in a consistent data representation across the different domains. Effectively, it has provided an environment whereby a great deal of the intelligence of the traditional application has been moved into the data.

In addition to defining object classes which represent these complex configurable domains and the relationships among them, the object data manager 10 has a variety of methods that been defined for each of the specific object classes, which represent operations that may be applied to each object. For each object, the object specific processing represented by a particular method is performed here, completely insulating all other layers of the details. As an example, for the devices objects 601 (FIG. 12), methods 621-624 have been developed to define 621, undefine 623, configure 622, unconfigure 624, start, stop, test, and problem manage each logical or physical device objects, etc.

The object data manager offers the ability to:
Define arbitrarily complex data types (called descriptors)
Define relationships statically and dynamically between object classes/objects
Apply inheritance such that objects share descriptor values in both a vertical and horizontal direction
Provide a pseudo transactional processing mode which supports the undo of logical versions
Associate methods and triggers with objects
Support authorization such that access control lists may be associated with each object The object data manager 610 provides to the application writers the ability to create, relate, manage and manipulate object classes and their objects, without having an understanding of how the data is stored, and without having an understanding of what is needed to perform the operations on the objects. This offers a very powerful tool for representing complex objects and subobjects. In keeping with object orientation, the object data manager allows the user to define methods and triggers that relate operations to each object class or object.

Figure 9A:
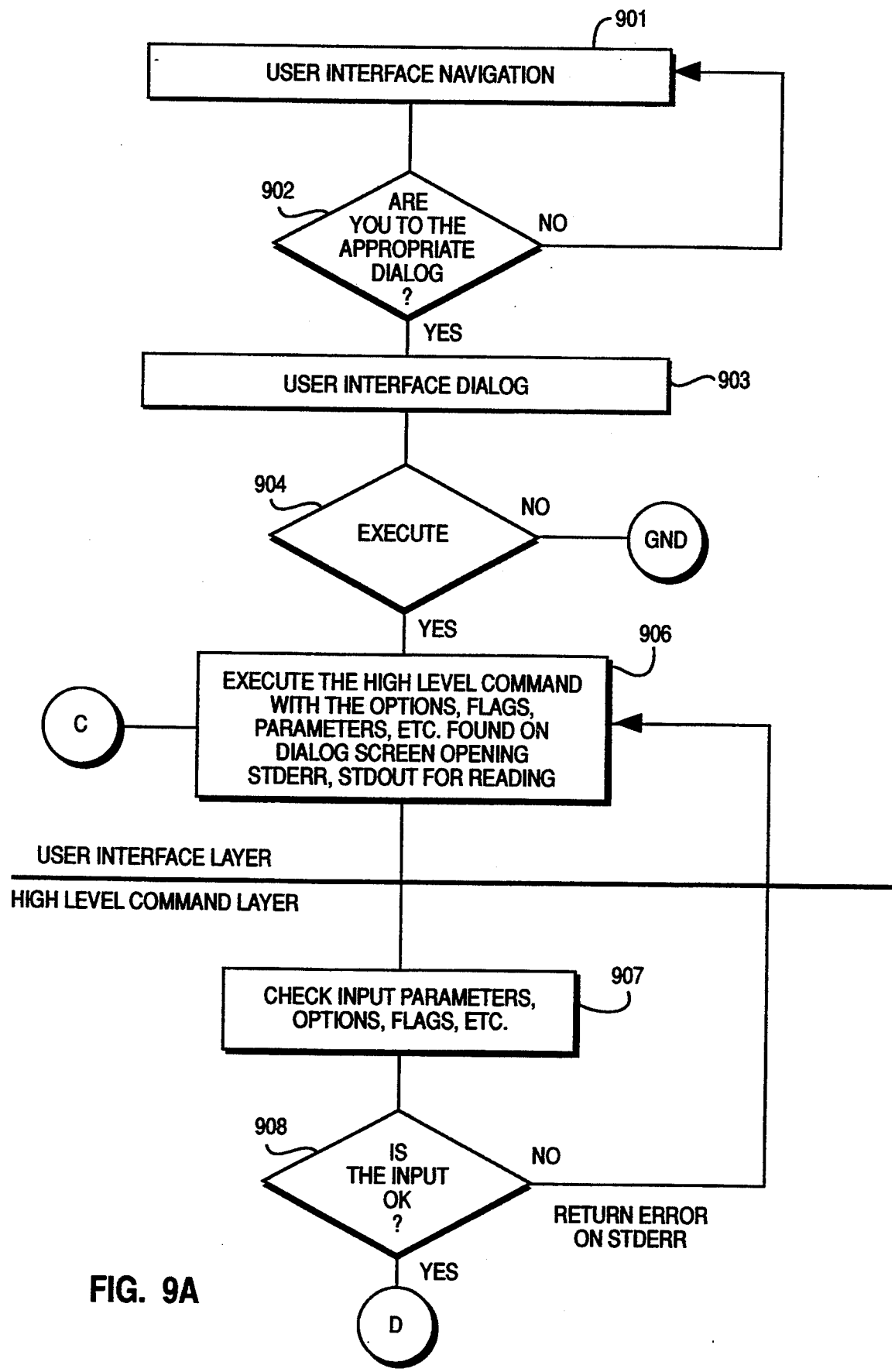
FIG. 9A is a flow diagram showing the flow of operation of this invention from the user interface layer to the high level command layer.
Figure 9B:
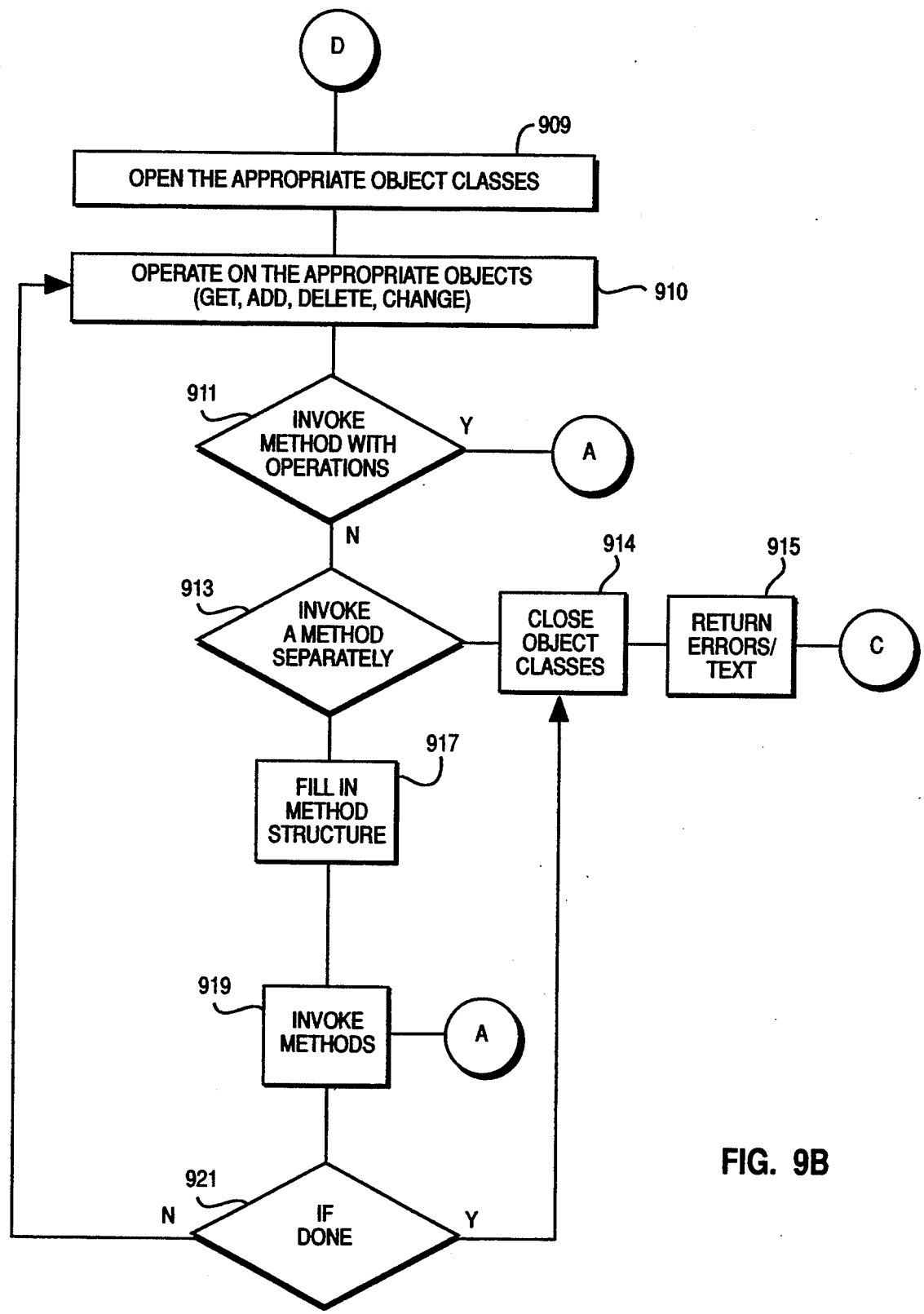
FIG. 9B is a flow diagram showing the flow of operation of this invention in the high level command layer.

FIGS. 9A-9B illustrate the flow of the system and method of this invention. First, a user begins at the top of the tree of the user interface 620 and navigates iteratively through the tree step 901 until the appropriate dialog is reached, step 902, in which the users wishes to enter data, change data, or list data, etc. When the appropriate dialog is reached, the user interfaces with the dialog, step 903, as indicated. Since a dialog represents an action, such as show data, delete data, add data, etc., the dialog is then executed, step 904. The executed dialog may be either adding a disk to a system, adding a user to a system, showing all the devices on the system, showing all the users on the system, deleting devices, or deleting users, etc., depending upon the configurable domain which the user is currently interacting with, and the action represented by the dialog which is chosen by the user.

The user interface 620 is a veneer which sits on top of the high level commands. In this way, the user interface 630 effectively executes the executable command, such as shown n FIGS. 14A-14J, with all of its options, flags, parameters, that had been filled in at step 903 and step 904 which enabled the dialog. In the process of executing the high level command, the user interface code performs the same function as shown and described later with reference to FIG. 10 in the way in which communication channels are managed. A communication channel is set up for reading standard error and standard output of the high level command that is invoked which is similar to the ODM method invocation facility.

After the dialog is executed, step 904, the high level command layer 630 is executed, step 906. Step 907 checks that the input parameters, options, flags, etc., that have been passed into it are valid. If any of these are n valid, step 908, an error is returned as an error message on the stderr communication channel. If an error is returned in text on the stderr communication channel, and the command was invoked from the user interface, at step 906, the user interface can read the error message and display the errors back to the user at step 903.

If the user input was correct, step 908, the flow continues at step 909 FIG. 9B. If a high level command or task is using the object data manager to get configuration represented as an object, the high level command would request that the object data manager open up the appropriate object class, or classes, where the objects are fond, step 909, and perform the appropriate operations no those objects, step 910. Depending upon how the code is written in the high level command, the methods, which are operations that apply to the objects, an either be invoked as part of the ODM call, step 911, such as the, show command, delete command, etc. as illustrated in odmget 812, FIG. 14F and odmadd 808, FIG. 14D, or after the operation is executed o the object, step 913. In either case, step 1001 of FIG. 10 is implemented either after step 911 or after step 919.

When all of the operations are performed, and all of the appropriate methods have been invoked, step 921 determines if the high level tasks are completed. If the high level tasks are completed, the appropriate object class, or classes, is closed, step 914. The appropriate text on standard output and standard error is then returned, step 915.

Figure 10A:
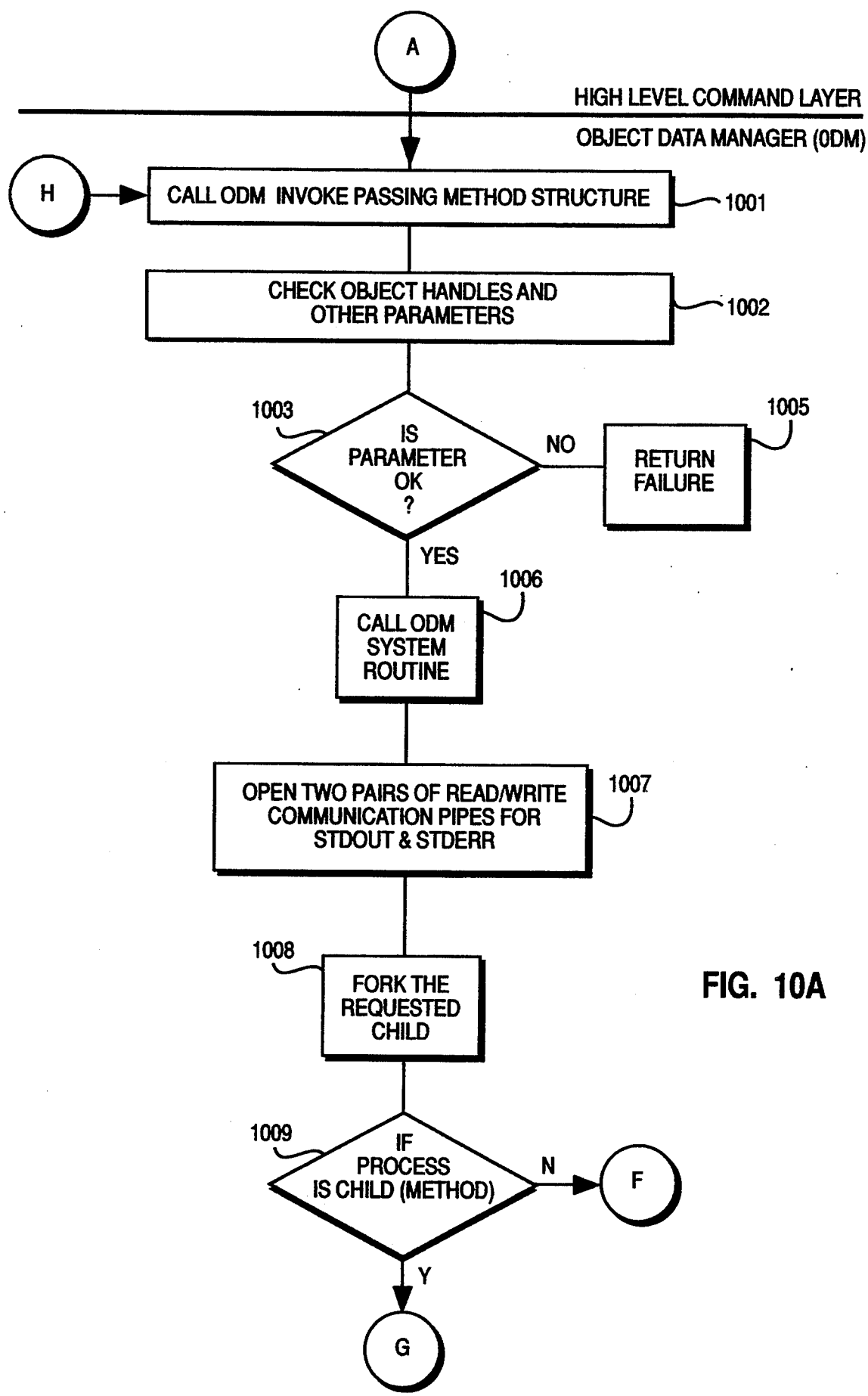
FIG. 10A is a flow diagram of the code that is executed when the object data manager invokes a method.
Figure 10B:
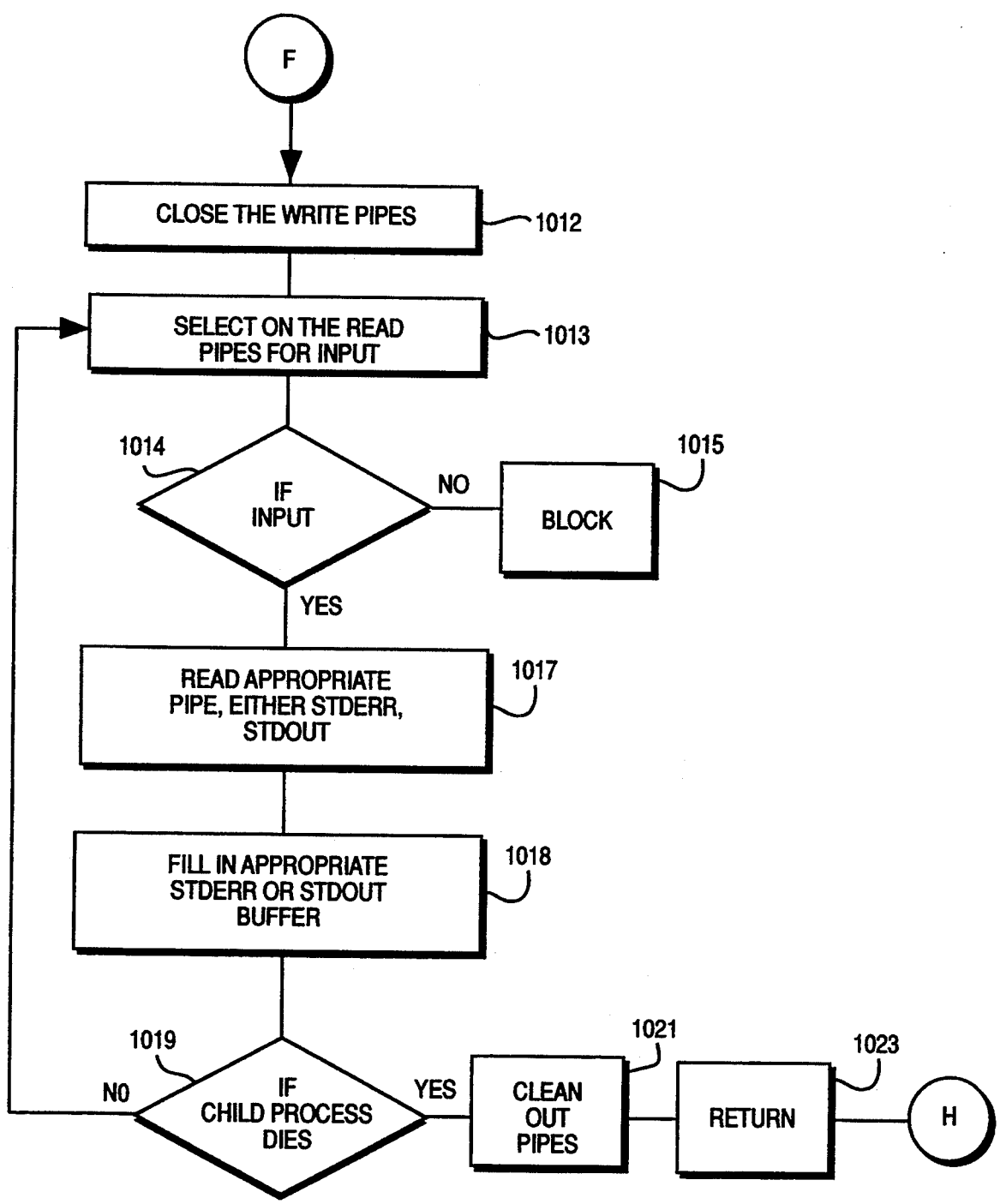
FIG. 10B is a continuation of the flow diagram of FIG. 10A.

The invocation of the methods, either step 911 or step 919, causes the ODM to execute the appropriate code to invoke the method, FIG. 10B. The object data manager supports an invoke call which takes a method structure 1301 FIG. 13, as its input, step 1001. The object data manager takes the parameters 1303, FIG. 13, the method name 1302, and searches in the data base for the appropriate method that pertains to the object. The object data manager invoke code insures that the method structure parameters, object handles, and pointers are valid, step 1002. If all of the parameters are valid, step 1003, the object data manager xsystem routine is called, step 1006, and opens two pairs of read/write communication pipes for standard output and standard error, step 1007. The child is forked, step 1008, by making an identical process to the parent. Step 1009 checks to see which of these two processes is the child between the identical copies.

If the process is the parent, the parent process closes all of the write pipes, step 1012, FIG. 10B, that were opened from step 1007. The parent process selects on the read pipes waiting for input, step 1013. The parent process blocks on the select() waiting for output from the child, step 1015. If output comes from the child process, step 1014, the parent process reads the appropriate pipe, either standard error o standard out, step 1018. From the read in step 1017, the parent process fills in the appropriate incore buffer with the text that is being read from the stderr or the stdout communication channel, step 1018. The parent process then loops back to the select, step 1013 waiting for more output from the child process.

A signal handler is used to catch the death of the child process, step 1019. When the signal is caught, the parent cleans out the pipes, step 1021, and returns, step 1023.

Figure 10C:
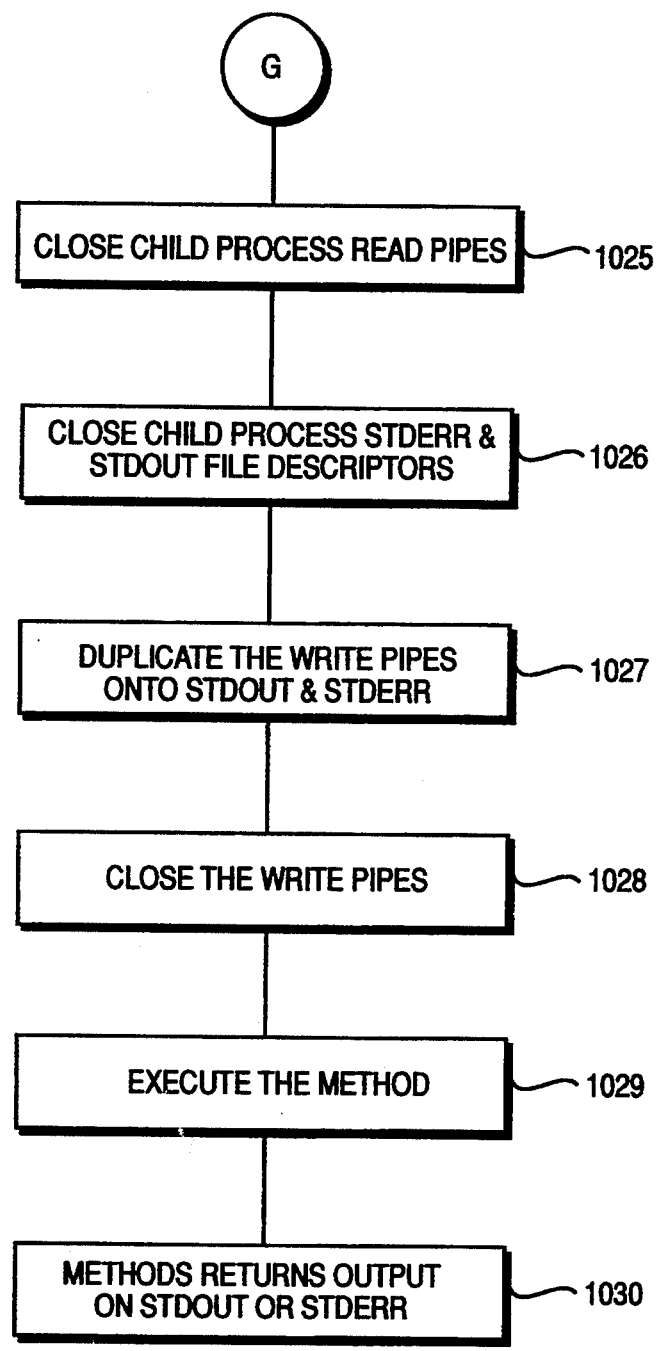
FIG. 10C is a continuation of the flow diagram of FIG. 10B.

If the process is the child, step 1009, FIG. 10A, the child process closes the read pipes, step 1025 FIG. 10C, that were created in step 1007 FIG. 10A. Then, the child's standard out and standard error file descriptors are closed, step 1026. The child process duplicates the write pipes, step 1027, that were opened in step 1007, FIG. 10A, onto the closed stderr and stdout file descriptors. After, stderr and stdout are attached to the write pipes that were opened, then the write pipes are closed, step 1028. The appropriate method is then executed, step 1029. If the method returns output on stdout or stderr, the parent can catch the output, step 1030.

This xsystem code, FIG. 10A–10C performs the equivalent of a popen system call and a fork/exec system call as known in association with the UNIX operating system a described in the AIX Operating System Technical Reference, second edition, Sep. 1986, order number SV21-8009, part number 74X9990, and which is hereby incorporated by reference. With the xsystem code, the interface 620 can capture the standard output. The standard output is the output from the high level commands such as the listing of the disks on the system, etc. The valid output comes out on the channel which is referred to as the standard output channel in the UNIX operating system. The interface also has the ability to capture the output from stderr, stderr output (the error output), of the high level command. The interface 10 can then display, scroll, and manage either standard output or standard error.

The above description illustrates the flow of this invention from calling the object data manager entry points as shown in FIG. 14A to FIG. 14M, and the method structure FIG. 13 which is filled in by the user-/application and the object data manager, and the xsystem code FIG. 10A–FIG. 10C that is invoked within the internals of the object data manager.

FIG. 8, FIG. 12, FIG. 11A, and FIG. 11B illustrate the uniform operation of the system management facility of this invention across configurable domains through the loosely coupled layers within the system management facility in conjunction with an object oriented representation of the configuration data. In reference first to FIG. 8 and FIG. 12, the user interface 620 creates a dialog for the configurable domain of devices 702, FIG. 7, by asking for the volume group name, the size, the node, and what logical volumes are in it. The high level command 630 performs an odmopen 1402 on the customized devices object class 601 on a particular node. The high level command 630 also attempts to perform an odmget 1412 on the volume group name to make sure the volume group does not already exist. The high level command 630 then invokes the add method 640 passing the appropriate parameters such as the volume group name, the logical volumes, and the size, etc. Then the high level command 630 performs an odmclose 1404. The vg_add method effectively adds objects of type logical volume group (lvg) to the customized devices object class 601, and to the customized attribute object class 631. The high level command 630 opens the appropriate object classes, adds the objects, closes the object classes, and returns any text.

FIG. 12 shows an example of the customized devices definition 601. The object class customized devices 601 is part of the device management configurable domain 702, FIG. 7. The configurable domain devices includes both real devices and logical devices. The names "hdisk0" 602, "lp0" 603, "tty0" 604, "tty1" 605, and "sa0" 606 represent names of physical entities, such as hard disks, line printers, terminals, and a serial adapter, on a system. These are device objects of type physical. Volume group 1, vg1, 607 and volume group 2, vg2, 608 are logical entities, i.e. objects. They are devices of type logical. These logical devices represent groupings of physical disks that make up volume groups in the logical volume manager. The system management facility of this invention allows the same configuration object class to represent both physical and logical devices. There is a link 630 in the customized devices 601 to customized attributes 631 which links the attributes to each device in the customized devices 601 object class. A link signifies that there is a relationship to another object class.

The operation of the object data manager is illustrated with reference to FIG. 12 as follows. The data, e.g. devices 612, are defined through the fields 613–640. The object data manager will transparently traverse the links 630 to the object classes 631 that relate to the object class that is being searched. For example, if a user opens up the customized object class 601 and requests all of the data for hdisk0 602, the object data manager would retrieve all of the information in the customized devices 601 and the customized attributes 31 relating to hdisk0 602.

The executable methods 621-624 are columns within the object class 601. The executable program for the methods can be fond in the files defined by the path names within the column fields. For example, the define method 621 for hdisk0 602 is found through the path name "/etc/sysmgt/hdisk_dfmeth". When the object data manager invokes a method 621-625, the method is executed. For example, to configure an object of type hard disks, there is a config method 622 for hard disks.

Another configurable domain, user management 710, FIG. 7, is illustrated with reference to FIGS. 11A and 11B which illustrates how one would use a user object 950 in the object data manager. A user interface 920 defines the appropriate dialog that is needed, for example, to add a user. The dialog 920 would ask for the user name 918, the password 922, the home directory 923, the groups 924 that the user wants to belong to, and the node 925 that the user is to be added to. Once this data was entered, the high level command makeuser, mkuser 930, would be invoked. The high level command 930 takes all of the parameters 931-935 that were entered in the dialog 920. The high level command 930 validates the parameters for syntactical integrity, 936, issues an odmopen 1402 (FIG. 14A) on the appropriate object class, e.g. users 950 FIG. 11A, and issues and odmget 1412 (FIG. 14F) to ensure that the user does not already exist, 938. Issuing the odmget could also be found in a method. Next, the high level command 930 invokes the add user_user method 940 to add the user object to the object classes. The add_user method again takes the set of parameters 931-935 to validate the semantic integrity by determining whether a user already exits, and whether the group exists, 941. If these do not already exist, the method 940 adds the user to the appropriate object class 950 (FIG. 11A), and updates or adds the appropriate group information, 942. All of this would be done by calling the appropriate low level functions.

Figure 11A:
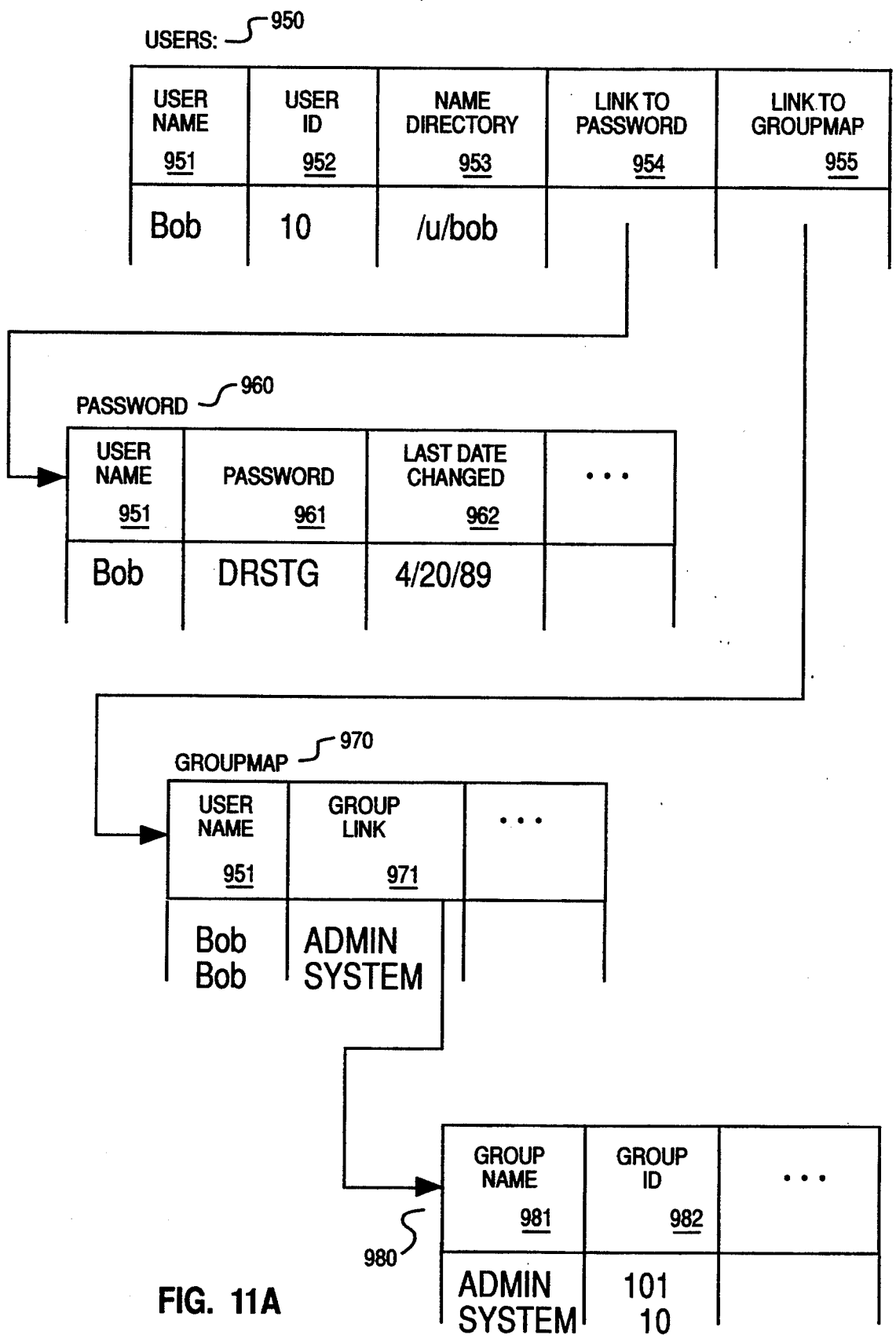
FIG. 11A illustrates a user object class linked to other object classes in the object oriented database for the configurable domain users.
Figure 11B:
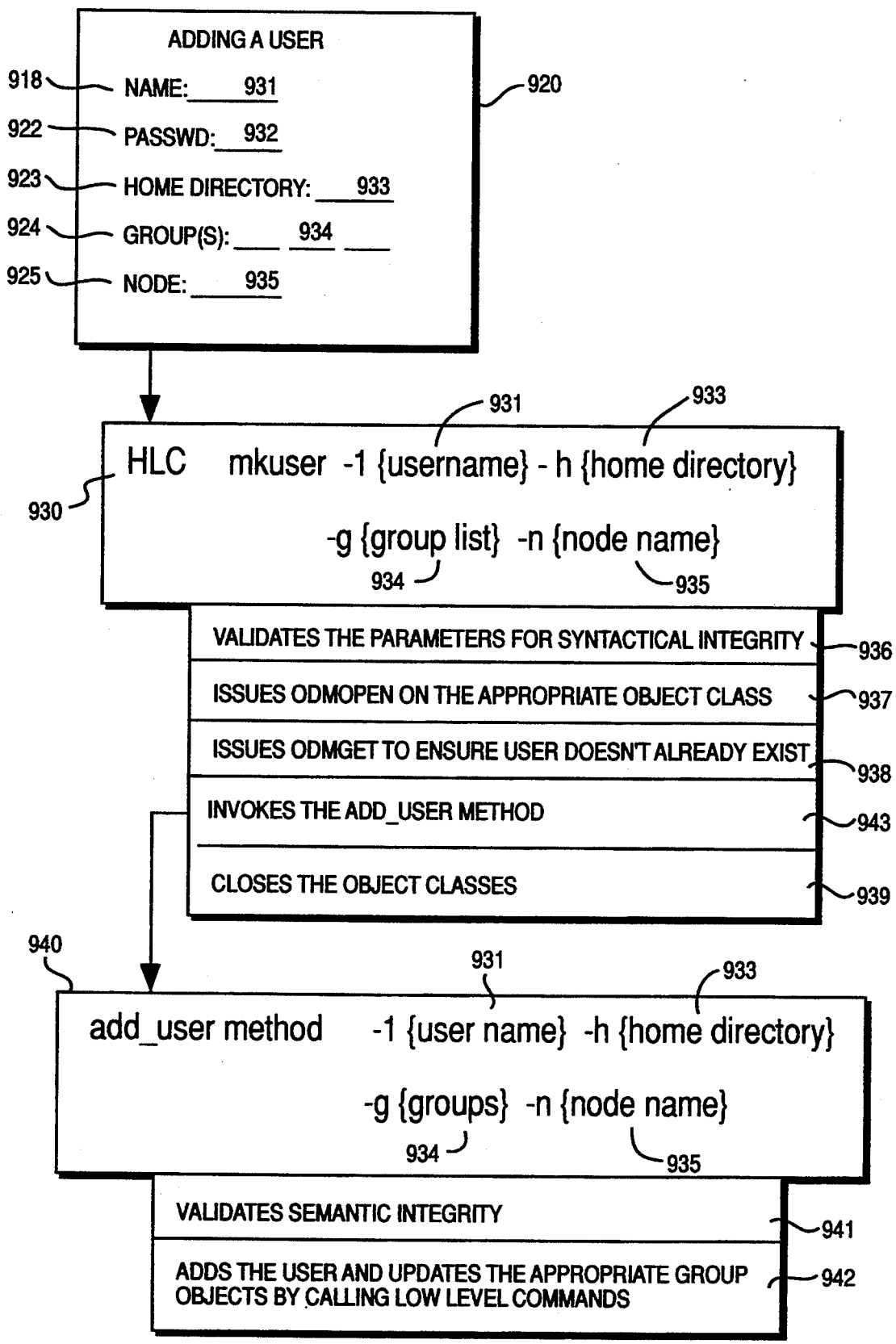
FIG. 11B illustrates the flow through the loosely coupled layers when using the system management facility of this invention with the configurable domain for user management and the user object class as shown in FIG. 11A.

FIG. 11A represents an example of data that would be added by the method 940 of FIG. 11B. FIG. 11A also illustrates an example of object classes representing user information. A user object class 950 has a user name 951, user id 952, the home directory 953, etc. A link 954 to the password object class 960 contains the user name 951, the user password 961, and the date the password was last changed 962, and other relevant information. The password object claws 960 is a separate object class for security requirements. In the user object class 950, there would also be a link to a groupmap 970 which would provide the relationship between the users and the groups that the users belong to. In this example, the user Bob belongs to the admin group and the system group. The groupmap object class 970 has a link 971 to a group object class 980 where the group ids 982 can be obtained along with other relevant information on the groups themselves.

FIGS. 14A-14J illustrate some of the calls and data structures that utilize the object data manager and invoke methods. Both the high level commands and the methods utilize this interface to the object data manager. For example, the odmet 1412, FIG. 14F, specifies the criteria of the objects to be retrieved, passes the parameters, and invoke the methods for the retrieved object. The method structure 1437 contained within the odmget call 1412, FIG. 14F, and the odmadd call 1408, FIG. 14D, is shown as 1301 in FIG. 13.

Referring to FIG. 13, a user would supply method names 1302 to invoke, any optional parameters 1303 that need to be passed down to the method, whether the output of the method is to be returned on stdout 1304, and whether the error is to be returned no stderr 1305. The method is then executed. The object data manager supplies the return code value 1306 of the method. In addition, the object data manager supplies the buffer information for stdout 1304 and stderr 1305 from the code as flowcharted in FIGS. 10A-10C.

Referring to FIG. 14A-14J, the following odm interfaces are described.

odmopen() 1402, opens an object class.

odmclose() 1404, closes an object class.

odminvoke() 1406, invokes a method for the specified object.

odmadd() 1408, adds a new object to the object class.

odmdelete() 1410, deletes an object from the object class, given search criteria.

odmget() 1412, retrieves an object from an object class.

odmcreate() 1414, creates an empty object class.

odmdrop() 1416, removes an object class.

odmchange() 1418, changes the contents of an object.

The subroutine odmopen() 1402, FIG. 14A opens the object class and locks in the manner defied through either the class_info structure or the ODM_env structure. If EXPAND is specified, all of the class's subclasses are opened also.

--- objectdesc 1431 description of the object class to open. You must specify:

| | |
|---|---|
| objectdesp: class_name | name of the object class |
| objectdescp: class_rep_path | default path of master index. If not specified, the master index is in /etc/objrepos. |
| objectdescp: lock_op | overrides the lock type specified at odminit(). If ODM_DEFAULT, default was specified at odminit(). |
| objectdescp: checkpoint | overrides the checkpoint type specified at odminit(). If OMD_DEFAULT, default was specified at odminit(). |
| objectdescp: expand_flag | one of EXPAND or NOEXPAND. EXPAND means open subclasses, NOEXPAND means don't open subclasses. The default is EXPAND. |

--- objecthandle 1432 filled in by odmopen() and will be the ID for this object class. This variable will be used by most of the ODM subroutines. Upon successful completion, the odmopen() subroutine returns the number of columns in the expanded object. If the subroutine fails, a value of −1 is returned.

The subroutine odmclose() 1404, FIG. 14B performs a virtual close of an object class. The object class is not actually purged from memory unless an odmopen() at some later time runs out of available slots. In this case, those object classes which have been odmclosed will actually be closed out. The force flag provides the capability of forcing the requested object class to actually be closed out.

--- objecthandle 1432 the object class ID returned from odmopen().
force 1433 one of FORCE, NOFORCE, or ODM_DEFAULT.

| | |
|---|---|
| FORCE | requested object will be closed, and purged from memory. |
| NOFORCE | requested object will be closed, but not purged from memory. |
| ODM_DEFAULT | requested object will be closed; the option specified at odminit() will determine whether the object class |

-continued is purged from memory.

Upon successful completion, a value of 0 is returned. If the odmclose() subroutine fails, a value of −1 is returned.

The subroutine odminvoke() 1406, FIG. 14C, invokes a method for the specified object(s). This provides the capability of invoking methods without adding, changing, deleting, or retrieving objects. Upon success completion, a value of 0 is returned. If the odminvoke() subroutine fails, a value of −1 is returned.

The subroutine odmadd() 1408, FIG. 14D, given the object class to add to and he corresponding data, will add a new object to the object class. You can add one object to each sub-class of this object class. If inherit substitution is done, then the values to be added will be replaced by the inherit constant if they exactly match the corresponding value.

```
objecthandle 1432 the ID of the object class; returned
    from odmopen()
new_1434 pointer to the new values to add. the
    data will be formatted differently depending on
    the value of the informat flag.
informat 1435 describes the format of the data. It is
    one of: COLON, STANZA, ODM, or INTERNAL_RAW.
    informat = COLON      new_values will point to
                          a new colon phrase.
    informat = STANZA     new_values will point to a
                          stanza phrase.
    informat = ODM        new_values will point to an
        array of descript_content structures. This
        is the same structure returned by the
        odmget() subroutine. Descriptors may be in
        any order for any class or subclass in the
        object class. This array need only specify
        descriptors which need to be initialized.
    informat = INTERNAL_RAW  new_values will point
        to a(n array of) pointer(s) to the new values to
        add. If DO_INHERITING is specified, then the
        inherit constant will be added for that descriptor.
        These new values are assumed to be in the same
        order as the descriptors would be returned by
        odmgetdescp(). If the new value is for a descrip-
        tor of type ODM_LONG or ODM_SHORT, then the
        value must be in long or short ormat, respectively. For
        all other descriptors, the value must be in char
        format. A descriptor of the type ODM_REPEAT will
        not have any value associated with it, but the
        new_values must still have a place for it.
user_flags 1436 Specifies whether the object is
    being added to the expanded object class, and
    whether an inherit object is being added or inherit
    substitution should be done. One of the EXPAND or
    NOEXPAND should be logically or'd with one of
    DO_TO_INHERIT, DO_INHERITING or
    ODM_DEFAULT:
    EXPAND            add to the expanded object
                      class.
    NOEXPAND          add to the non-expanded
                      object class.
    DO_TO_INHERIT     add the inherit object to
                      the object class.
    DO_INHERITING     add the object but check the
        values to see if they're identical to
        the inherit object. If so, add the
        inherit constant instead of the value
        itself.
methods_to_do 1437 pointer to an array of
    method_description structures which indicate the
    methods to execute when the add is performed. Only
    the method which are indicated are executed. Note
    that triggers will execute regardless.
    method_to_do: method_name    name of the
        method descriptor to perform.
    methods_to_do: optional_params  any
        optional parameters to be used in
        the method.
    methods_to_do: std_out        standard
        output from the method
    methods_to_do: std_err        standard error
        output from the method.
    methods_to do: return_value   return value
        of the method.
    methods_to do: capture_out    one of TRUE or
        FALSE whether you want ODM to
        capture the output.
    The end of the array of structures is
    marked by the method_having a null
    value. If methods_to_do = NULL then no
    methods will be performed.
```

Upon successful completion, an ID for the object is returned (O). If the odmadd() subroutine fails, a value of −1 is returned.

The subroutine odmdelete() 1410, FIG. 14E, given the object class to delete from a search criteria pointer, deletes all instances which satisfy those criteria.

```
objecthandle 1432 the object class ID returned by
    odmopen().
ucrit 1438 contains the criteria used to determine
    which objects to delete.
    ucrit: searchstring is the object selection
        string. If its string length is zero,
        then all objects are selected to be
        deleted.
    ucrit: repeats_interested = DELETE_ALL
        specifies to delete all the object which match
        the criteria.
    ucrit: rspecify(0).iterator can be set to
        specify which object to delete if several
        objects match the selection criteria.
    You can also delete an object by its ID
    as returned by odmadd(). There is a #define n
    odm.h with the name of the object class descriptor
    which contains the object ID. You need only
    specify a criteria with this descriptor name and
    the object ID returned by odmadd().
user_flags 1436 specifies whether you are deleting
    from the expanded object class, and whether you are
    deleting the inherit object or want inherit substi-
    tution done. Should be one of EXPAND or NOEXPAND
    logically or'd with one of DO_TO_INHERIT,
    DO_INHERITING or ODM_DEFAULT. The inherit
    object must exist if either inheriting options are specified.
    EXPAND            delete from the expanded
                      object class.
    NOEXPAND          delete from the non-expanded
                      object class.
    DO_TO_INHERIT     the inherit object in the
                      object class is deleted.
    DO_INHERITING     the user's criteria are
        checked and modified, if
        necessary, to select those objects which
        would satisfy the criteria because of
        inheriting.
methods_to_do 1437 pointer to an array of
    method_description structures which indicate the
    methods to exectue when the delete is performed.
    Only the methods which are indicated are executed.
    methods_to do: method_name    name of
        the method descriptor to perform.
    methods_to_do: optional_params  any
        optional parameters to be used in the
        method
    methods_to_do: std_out        standard
        error output from the method.
    methods_to_do: return_value   return
        value of the method.
    methods_to_do: capture_out    one of
        TRUE or FALSE whether you want ODM to
        capture the output.
    The end of the array of structures is
    marked by the method_name having a null value. If
``` methods_to_do = NULL then no methods will be
performed.

Upon successful completion, a value of O is returned. If the odmdelete() subroutine fails, a value of −1 is returned.

The subroutine odmget() 1412, FIG. 14F, given the object class, will retrieve the objects from the class which meet the search criteria. If the object class is made of compound object classes, the use can elect to either expand the output or not. In addition this subroutine will support the buffer in ODM, STANZA, or COLON format.

Any descriptor which is not of the type ODM_SHORT or ODM_LONG and has its value as NULL will not be shown.

The odmget() subroutine needs to be called iteratively in order to fetch multiple objects meeting the selection criteria. This is accomplished in the following manner: 1) to get the first object provide a valid ucrit address to point to a valid search structure 2) for each subsequent call to get the NEXT object, supply a ucrit address of NULL.

--- objecthandle 1432 object class ID returned from
   odmopen().
ucrit 1438 the criteria used to determine which object
   the user wants.
   ucrit: searchstring will hold the selection
     criteria for the object class.
   ucrit: searchstring(0)='/0 specifies a global
     search criterion or you can enter criteria in SQL
     format. This criteria can include desriptors from
     the top object class, as well as subclasses if the
     object class were opened expanded. If the descriptor name is not unique to the expanded object class, it should be qualified by the name of the object sub-class in which it resides (i.e. newclass.name where name is the descriptor name, and newclass is the name of the object class qualifying name).
user_flags 1436 specifies whether we are getting the
   expanded object class, and if the user is getting the
   inherit object or wants inherit substitution done.
   Should be one of EXPAND or NOEXPAND logically or'd
   with one of DO_To_INHERIT, DO_INHERITING, or
   ODM_DEFAULT.
   EXPAND               get an expanded object
   NOEXPAND          get a non-expanded object
   DO_TO_INHERIT   get the inherit object of the
     object class
   DO_INHERITING   get the object and substitute
     the inherit value if necessary. Also, modify
     the user criteria to select those objects
     which satisfy the criteria because of inherited values.
outformat 1439 describes the format of the data
   retrieved and put into descriptr. It is one of: COLON,
   STANZA, or ODM.
   outformat = COLON   * descriptr will point
                                 to a colon phrase.
   outformat = STANZA  * descriptr will point
                                 to a stanza phrase.
   outformat = ODM     * descriptr will point
                                 to an array of
                                 descrip_content
                                 structures.
methods_to_do 1437 pointer to an array of
   method_description structures which indicate the methods
   to execute when the add is performed. Only the methods
   which are indicated are executed.
   methods_to_do:  method_name  name of the
      method descriptor to perform.
   methods_to_do:  optional_params  any optional
      parameters to be used in the method
   methods_to_do:  std_out  standard output
      from the method.
   methods_to_do:  return_value  return value of
      of the method.
   methods_to_do:  capture_out  one of TRUE or
      FALSE whether you want ODM to
      capture the output.
   The end of the array of structures is marked
   by the method_name having a null value. if
   methods_to_do = NULL then no methods will be
   performed.
descriptr 1440 pointer to the desired object. This
   value must be (struct descrip_content*) NULL when passed
   to odmget(). If not NULL, ODM will attempt to execute
   odmfreeget(descriptr). See the note below for more
   information. If outformat is STANZA or COLON, then the
   object is found in the first descrip-content structure.
   If the outformat is ODM then descriptr will point to an
   array of descrip_content structures which will have
   pointers to the object's values. The number of
   descrip_content structures will be the return value of
   the successful odmget().
struct descrip_content(
   char *descrip_value;
      /* pointer to a value in either a
      short, */
      /* long, or char (null terminated
      format*/
   int ODM_type;
      /* the ODM type of this descriptor */
   int iterator;
      /* currently unused */
   char descrip_name (MAX_DESCRIP_NAME);
      /* object class which this
      descriptor */
      /* came from */
   char parent_descrip (MAX_DESCRIP_NAME +
                      MAX_CLASS_NAME_ 10);
      /* object class and descriptor
      which */
      /* linked to the object class from
      which */
      /* this descriptor came */
   int descrip_number;
      /* the unique id for this
      descriptor. */
   int size;
      /* length of this descriptor
      value */
   int linktome;
      /* TRUE if this column is linked
      to; */
      /* FALSE otherwise */

---

Note: Because the ODM uses noncontiguous allocation schemes, it will perform the dynamic allocation of memory on behalf of the caller. It is important that both the ODM and the caller properly manage this dynamic memory. Specifically, the user may pass to odmget() different descriptor pointers for the purposes of caching multiple objects from any number of object classes at the same time. If this is so and the pointers passed to odmget() are automatic variables, odmfreeget() must be called before exiting the local function (this will free the memory). If the caller is using pointers which are not automatic, then one does not need to worry about calling odmfreeget(). The motivation for odmfreeget() is to ensure that the ODM is not continually allocating memory to pointers which are transient and thus resulting in danglingmemory with no way to manage it.

Upon successful completion, the odmget() subroutine returns the number of descriptors. If the subroutine fails, a value of −1 is returned.

The subroutine odmcreate() 1414, FIG. 14G, will create an empty object class by establishing the necessary director structures and creating the necessary files.

The object class will be created at the location determined by the node and availability scope in the class_info structure. If the object class is created successfully, it will be registered with the appropriate Object Manager. The object class name must be unique within its availability scope.

| | | |
|---|---|---|
| classattr | a description of the object class to create, it contains: | |
| classattr: | class_name | name of the object class to create |
| classattr: | class_rep_path | path for the object class. If not specified, the object clas will be created in /etc/objrepos. |
| classattr: | num_descrip | number of descrip_info structures passed in by the user. This might not be the same number of ndescriptors in the created object class since the ODM might create additional descriptors based on the values in the descrip_info structure. |
| descripattr | a pointer to an array of descrip_info structuresd where each structure contains: | |
| descripattr: | descrip_name | descriptor name |
| descripattr: | ODM_type | ODM type. |
| descripattr: | iterator | number of times to repeat descriptor |
| descripattr: | key | flag to specify wheter to create index |
| descripattr: | size | specifies the descriptor length for ODM_CHAR, ODM_LONGCHAR, and ODM_BINARY types |
| descripattr: | class name | specifies the object class to use for ODM_REPEAT and ODM-LINK types |
| descripattr: | link_descrip | specifies the descriptor in the linked/vlinked object class which will hold the value to link/vlink for ODM_LINK and ODM_VLINKCLASS. |

Upon successful completion, a value of 0 is returned. If the odmcreate() subroutine fails, a value of −1 is returned.

The subroutine odmdrop() 1416, FIG. 14H, removes an entire object class and all of its objects. Not that there is no checking done to see if there are other object classes are linked to the object class to be removed.

| | | |
|---|---|---|
| class_info | a description of the object class to drop. Currently, the only value needed is: | |
| class_info: | class_name name of the object class to delete. | |
| force | one of FORCE or NOFORCE. | |
| FORCE | object class is deleted even if the object class links to other object classes. | |
| NOFORCE | If this object class links to other object classes, the class is not deleted. | |

Upon successful completion, a value of 0 is returned. If the odmdrop() subroutine fails, a value of −1 is returned.

The subroutine odmchange() 1418, FIG. 14I, given the object class to modify, the search criteria and the new data (only for attributes which need to change), will modify all objects which satisfy the search criteria.

objecthandle 1432 object class ID returned from odmopen().

objcontent 1443 pointer to the new value to add. The data will be formatted differently depending on the value of the informat flag.
    informat = COLON    objcontent will point to a colon phrase.
    informat = STANZA    objcontent will point to a stanza phrase.
    informat = ODM    objcontent will point to an array of descrip_content structures. This is the same structure returned by the odmget() subroutine.
    ifnormat = IBM_INTERNAL_RAW objcontent will point to a(N array of) pointers(s) to the values to change. If a pointer to a value is NULL, then no change is made to that descriptor. These new values are assumed to be in the same order as the descriptors would be returned by odmgetdescp().

ucrit 1438 the criteria used to select an object or objects. This criteria can include descriptors from the top object class, as well as subclasses if the object class was opened expanded. If the descriptor name is not unique to the expanded object class, it should be qualified by the name of the object sub-class in which it resides (i.e. newclass.name where name is the descriptor name, and newclass is the name of the object class qualifying name). For the classes you can specify either all matching objects or only a certain object will be changed.
    ucrit: repeats_interested    specifies how many object classes in which you want a certain object to be changed.
    ucrit: specifiy (O).objname    object class
    ucrit: specify (i).iterator    the specific object in the class to change. If you do not specify an object to be changed in the object class, then all objects which match the criteria (either the user criteria or link criteria) will be changed.

You can also change an object by its ID as returned by odmadd(). There is a #define in odm.h with the name of the object class descriptor which contains the object ID. You need only specify a criteria with this descriptor name and the object ID returned by odmadd(). See the example below.

user_flags 1436 specifies whether we are changing the expanded object class, and whether the user is changing the inherit object or wants inherit substitution done. Should be one of EXPAND or NOEXPAND logicall or'd with one of DO_TO_INHERIT, DO_INHERITING, or ODM_DEFAULT.
    EXPAND    change the expanded object class.
    NOEXPAND    change the non-expanded object class.
    DO_TO_INHERIT    change the inherit object in the object class.
    DO_INHERITING    change the object but check the values to see if they are identical to the inherit object. If so, change the descriptor to the inherit constant instead of the value itself.

methods_to_do 1437 pointer to an array of method_descriptor structures which indicate the methods to execute when the add is performed. Only the methods which are indicates are executed.
    methods_to_do: method_name    name of the method descriptor to perform.
    methods_to_do: optional_params    any optional parameters to be used in the method
    methods_to_do: std_out    standard output from the method.
    methods_to_do: std_err    return value of the method. The end of the array of structures is marked by the method_name having a null value. If methods_to_do = NULL then no methods will be performed.

-continued

| | |
|---|---|
| methods_to_do: capture_out | one of TRUE or FALSE whether you want ODM to capture the output. |

Upon successful completion, a value of 0 is returned. If the odmchage() subroutine fails, a value of −1 is returned.

The subroutine odmterm() 1426, FIG. 14J, notifies the ODM that no further ODM functions will be used so that all ODM internal data structures can be freed and all updates to the object repository are propagated to disk. After this subroutine is called, the odminit() subroutine must be called again before using any of the ODM subroutines. Upon successful completion, a value of 0 is returned. If the odmterm() subroutine fails, a value of −1 is returned.

While the invention has been particularly shown and described with reference to a preferred embodiment, it will be understood by those skilled in the art that various changes in form and detail may be made without departing from the spirit and scope of the invention.

I claim:

1. A method for controlling access privileges to data, said method comprising:

assigning at least one access control policy associated with a plurality of dynamically assignable groups across a plurality of dynamically extendable external objects in an object oriented database;

traversing objects to dynamically extend access control policies to encompass a newly extended object;

controlling a plurality of operations including an execute operation applied to execution of a plurality of methods to at least one of said plurality of dynamically extendable objects based on said assignment and at last one credential of a user requesting access to said data represented by at least one of said plurality of dynamically extendable; and inheriting said assigned at least one access control policy by a second of said external objects descending from said at least one object; said inheriting further including determining a least amount of privilege associated with at least one composite object accessed by said user.

2. A system for controlling access privileges to data, said system comprising:

means for assigning at least one access control policy associated with a plurality of dynamically assignable groups across a plurality of dynamically extendable external objects in an object oriented database;

means for traversing objects to dynamically extend access control policies to encompass a newly extended object;

means for controlling a plurality of operations including an execute operation applied to execution of a plurality of methods to at lest one of said plurality of dynamically extendable objects based on said assignment and at least one credential of a user requesting access to said data represented by at least one of said plurality of dynamically extendable objects; and means for inheriting said assigned at least one access control policy by a second of said external objects descending from said at least one object;

said means for inheriting further including means for determining a least amount of privilege associated with at least one composite object accessed by said user.

* * * * *